(12) United States Patent
Cirrone

(10) Patent No.: US 6,185,479 B1
(45) Date of Patent: Feb. 6, 2001

(54) ARTICLE SORTING SYSTEM

(76) Inventor: John F. Cirrone, 9 Robin La., Pepperell, MA (US) 01463

( * ) Notice: Under 35 U.S.C. 154(b), the term of this patent shall be extended for 0 days.

(21) Appl. No.: 09/060,626

(22) Filed: Apr. 15, 1998

(51) Int. Cl.[7] .................................................... G06F 17/00
(52) U.S. Cl. .......................... 700/216; 700/213; 700/214; 700/217; 700/218; 700/219
(58) Field of Search .................................... 700/216, 213, 700/214, 217, 219, 218, 220–222, 230

(56) References Cited

U.S. PATENT DOCUMENTS

| | | |
|---|---|---|
| 3,422,969 | 1/1969 | Miller et al. . |
| 3,640,412 | 2/1972 | Traube . |
| 3,836,017 * | 9/1974 | Bargstedt ................................. 214/6 |
| 4,022,332 | 5/1977 | Freakes et al. . |
| 4,049,258 | 9/1977 | Zeblisky . |
| 4,049,259 | 9/1977 | Ventz . |
| 4,672,553 | 6/1987 | Goldberg . |
| 4,681,502 * | 7/1987 | Staufner ................................. 414/121 |
| 4,874,281 | 10/1989 | Bergerioux et al. . |
| 5,024,577 | 6/1991 | Miura . |
| 5,220,511 * | 6/1993 | Speckhart et al. .................... 700/223 |
| 5,363,310 * | 11/1994 | Haj-Ali-Ahmadi et al. ......... 364/478 |
| 5,395,206 * | 3/1995 | Cerny, Jr. ............................... 414/786 |
| 5,403,147 * | 4/1995 | Tanaka .................................. 414/786 |
| 5,547,084 * | 8/1996 | Okada et al. ......................... 209/583 |
| 5,793,305 * | 8/1998 | Turner et al. ..................... 340/10.34 |
| 5,953,234 * | 9/1999 | Singer et al. .................... 364/478.02 |
| 6,085,914 * | 7/2000 | Tobaccowala et al. ............... 209/702 |

* cited by examiner

Primary Examiner—Ayaz R. Sheikh
Assistant Examiner—Frantz Blanchard Jean
(74) Attorney, Agent, or Firm—Blodgett & Blodgett, P.C.

(57) ABSTRACT

The present invention relates to a system for organizing the assembly of a retailer's order. The system of the invention includes a system computer, conveyor assemblies and multiple sections. Each section includes an assembly section computer which controls multiple picking machines, a section conveyor, printers, and bundlers. Multiple bins are filled with articles, such as magazines, by the picking machines; the section conveyor then transports each bin to their next respective picking machine to be filled with that title location's magazine. Once a bin has been serviced by each picking machine of each title location, the contents of the bin are ejected and bundled by a bundler. Then, all bundles of a retailer's order are assembled at a palletizing area awaiting to be loaded into the delivery truck. The system of the invention coordinates the retailer's order in sequence with the orders of other retailers so that the orders are organized within the routeman's truck so that each order is dropped off in sequence along the route. Each retailers' order is output out of the system such that the delivery truck is loaded so that the first delivery to a retailer is the first order to be taken off the delivery truck, and at the second stop of the delivery truck the second retailer's order is the next order of bundles to be taken off the delivery truck.

19 Claims, 25 Drawing Sheets

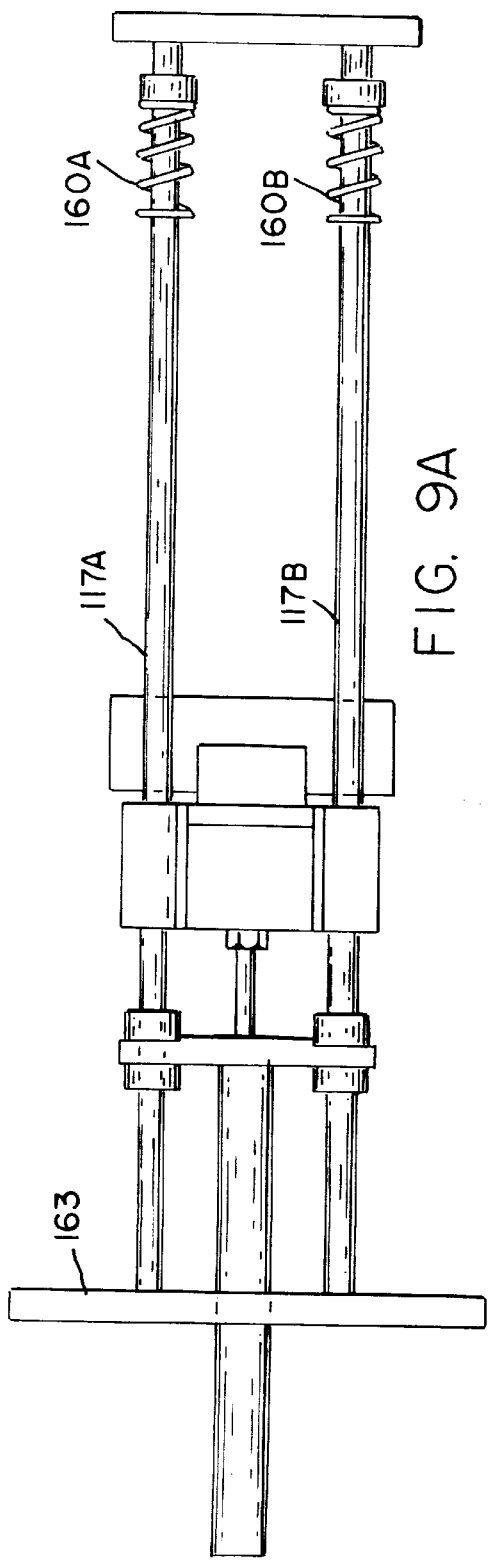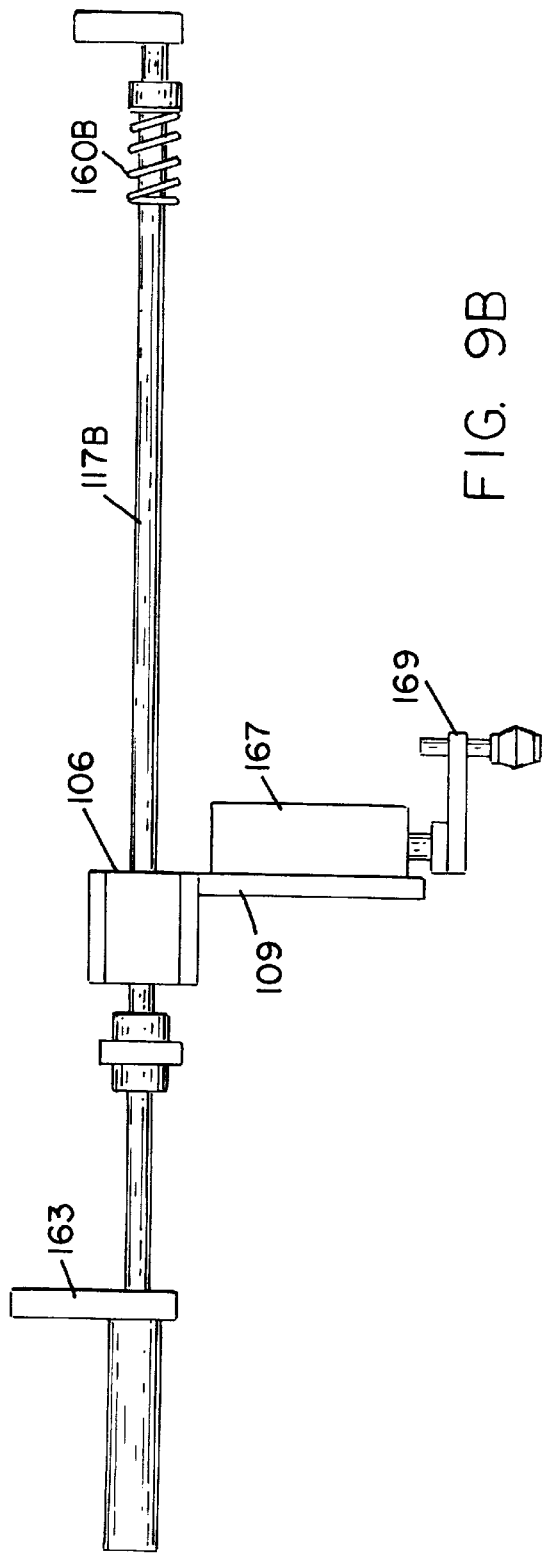

ARTICLE SORTING SYSTEM

BACKGROUND OF THE INVENTION

1. Field of the Invention

The invention relates to the organization and distribution of publications in the field of wholesale periodical distribution. More particularly, the invention concerns a system for organizing orders of magazines to be sent to retailers such as grocery stores, newsstands, etc, in which each order can include different types and different quantities of magazines. For example, the quantity of a given magazine for a given retailer can be determined by the distributor based on the previous sale history of the retailer, or based upon the retailer's order request.

2. Discussion of the Background

Wholesale distributors of publications have, at most, only partially automated the organization of various publications to be sent to a particular retailer. Typically, a worker manually fills an order for a given retailer by reading a request, and counting and manually filling a bin with the desired type and quantity of publications. The worker thus creates a bundle or plural bundles (if the order is larger), which are then bound and delivered to the retailer. This manual sorting operation has been necessary in order to assemble the unique groups of magazines and magazine quantities required for various retailers. Conventional magazine conveying assemblies have been unable to assemble and convey magazines corresponding to different retailer orders, and thus a bin for each order has been filled manually by a worker.

Traditionally, the distribution of periodicals to retailers by a distributor was territorial. As such the competition to keep a retailer as a customer was low. Recently, however, retailers have been sending out bids to various publication distributors to find the lowest price possible for their periodical needs, and thus, competition has increased. To remain competitive, a distributor must service a larger number of retailers over a larger geographical area. The distribution is complicated by the fact that the retailers require a diverse selection of magazine titles, the titles are issued at different periodic rates (weekly, monthly, etc.), and the selection and quantity of titles varies from retailer to retailer. Therefore, a distributor must organize various magazine titles, and various quantities, and the titles and quantities will also vary over time for a give retailer. Thus, once a periodical is received by the distributor it must be quickly turned around to the retailer so that the periodical retains its merchantability. As a result, distributors of periodicals must be able to handle larger numbers of retailers, while minimizing processing costs and increasing retailer satisfaction by providing rapid and accurately filled orders.

Thus, there is a need for a system so as to reduce the amount of time and money spent by distributors in the wholesale publication business so that they can maintain a profit margin while supplying the retailers with the lowest price possible at the highest quality service.

SUMMARY OF THE INVENTION

It is an object of the invention to provide a system for organizing retailer orders that efficiently assembles various and changing retail orders.

The overall system of the present invention includes multiple sections and a controller coordinating the actions of each section along with the associated conveyors, so as to deposit the appropriate retailer's order at the loading dock. Each retailer's order is deposited in sequence on the loading dock so that when the distribution truck is loaded with the retailers' orders, the distribution truck is then automatically loaded in sequence. The loading sequence of the distribution truck is such that the retailer's order for the first stop is the first order to be removed from the delivery truck.

Each assembly section includes plural components, referred to as "picking machines." Each picking machine of the invention includes a frame; a suction mechanism that is movably mounted on the frame; conveying means on the frame for delivering a stack of articles to a first position; and means for moving the suction mechanism to pick up an uppermost article from the stack of articles at the first position and moving the uppermost article to a bin. A group section computer coordinates the functions of the picking machines of that section as well as the section conveyor, printers, and bundlers. Each retailer's partial order that is produced from each section is formed into a bundle. The respective bundles from the different sections are then brought together by the overall controller (or main controller), to assemble the retailer's order.

Thus, the invention provides a system that reduces the time and cost of the assembly and distribution of a retail customer's order.

BRIEF DESCRIPTION OF THE DRAWINGS

A more complete appreciation of the invention and many of the attendant advantages thereof will be readily apparent from the following detailed description, particularly when considered in conjunction with the accompanying drawings, in which:

FIGS. 9A and 9B are top and side views of the suction mechanism for the article picking machine;

DESCRIPTION OF THE PREFERRED EMBODIMENTS

Figure 1:
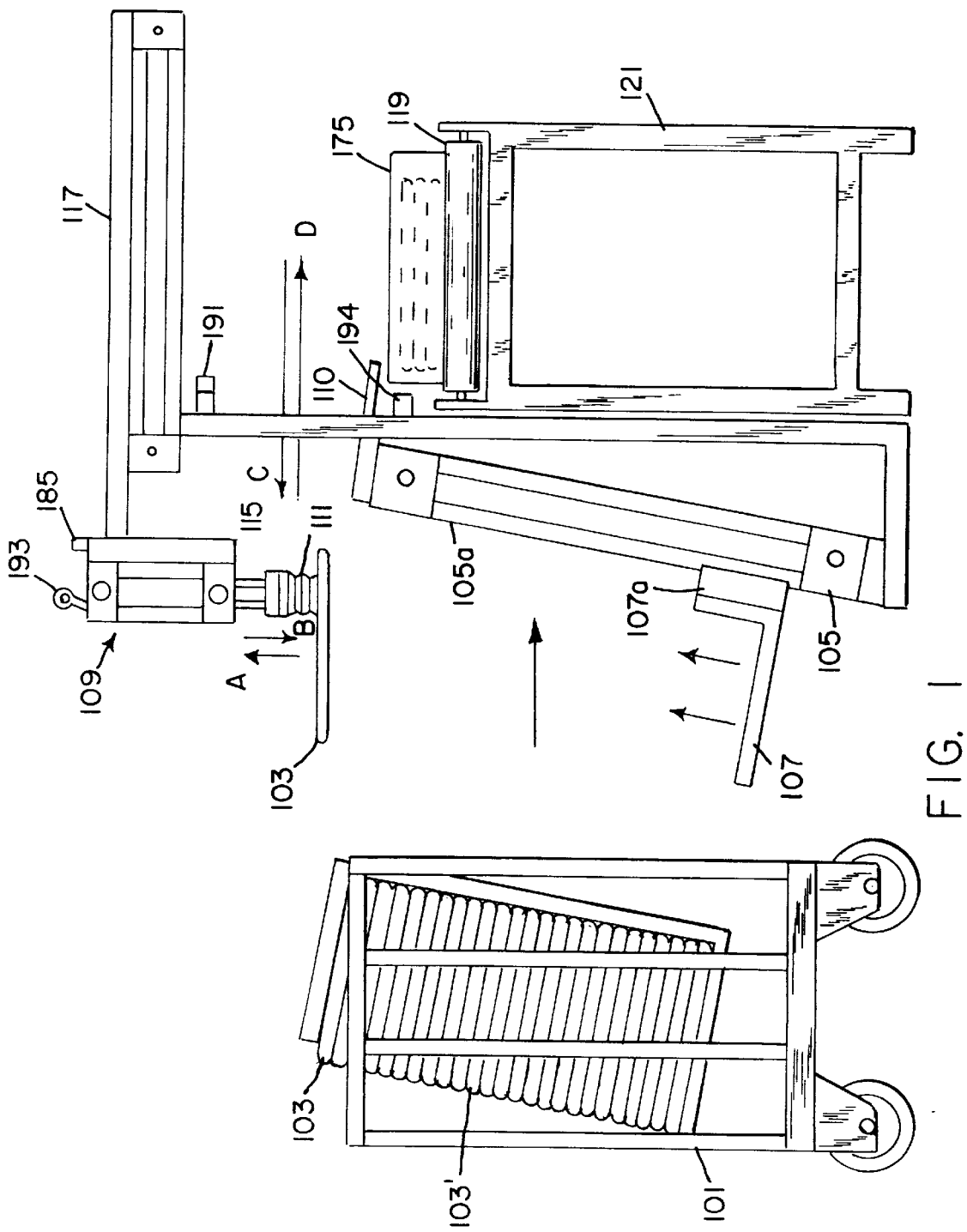
FIG. 1 depicts an article picking machine of the present invention, including a mechanism for delivering a stack of articles to the picking machine.
Figure 5:
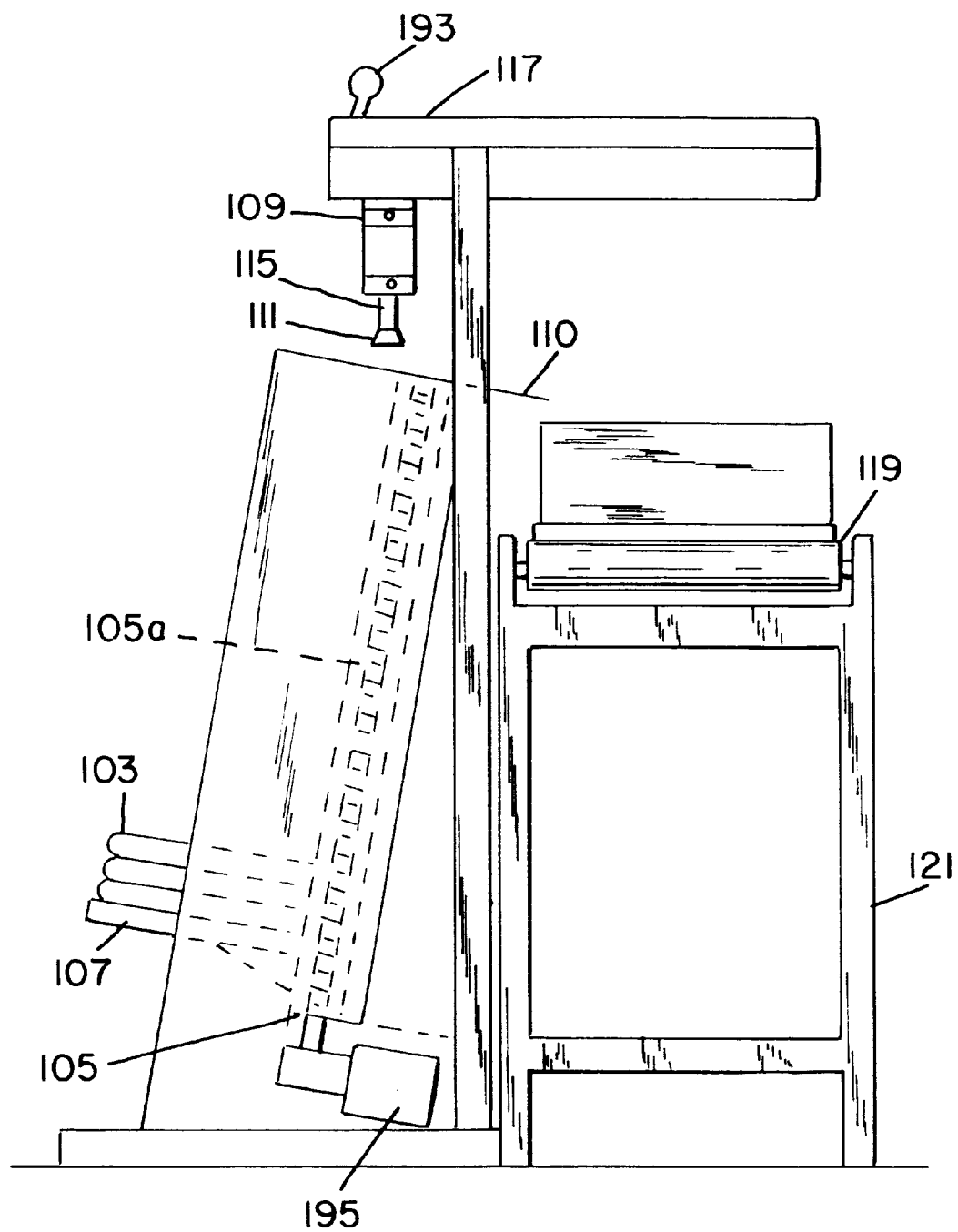
FIG. 5 is a side view of the article picking machine shown in FIG. 4.

Referring now to the drawings, wherein like reference numerals designate identical or corresponding parts throughout the several views, and more particularly to FIG. 1 thereof, FIG. 1 illustrates a movable cart 101 which can deliver a stack of articles 103', for example, a stack of magazines or newspapers, to a movable motorized conveyor mechanism 105. In a present form of the invention, stacks of articles (e.g., magazines or periodicals) are manually moved from the cart to the stack conveyor mechanism, and the stack conveyor mechanism then presents one article at a time to the suction mechanism of the picking machine. The shelf conveyor mechanism 105 includes movable shelves 107 (one of which is shown in FIG. 1). The stack of articles 103' is mounted on the shelf 107 and the motorized conveyor mechanism 105, which can be a belt and/or a gear arrangement (such as a threaded shaft) is operated to upwardly lift the stack of articles 103' mounted on the shelf 107. For example, the shelf conveyor mechanism 105 can include a threaded shaft 105a as shown in FIG. 5. Rotation of the shaft 105a by a motor 195 (FIG. 5) causes an upward movement of the shelves 107 threadedly engaged with the shaft 105a. As a further option, the shelves 107 can be lifted by a pneumatic cylinder or other means as discussed hereinafter.

Once the topmost article 103 of the stack of articles 103' reaches a top portion of the conveyor mechanism 105, a suction mechanism 109 is operated to pick up the uppermost article 103 of the stack of articles 103'. The suction mechanism 109 (FIGS. 1, 2 and 3) can be a pneumatic, vacuum type mechanism which utilizes air pressure and a suction cup 111 to suck up the topmost article 103 from the stack of articles 103'.

As illustrated in FIGS. 1, 2, 3 and 4, the suction mechanism 109 can include a plurality of the suction/vacuum cups 111 which abut against the top of the stack of articles 103' and lifts the topmost article 103. The suction mechanism 109 also includes a cylinder or other suitable actuator device 115 which permits the vacuum cups 111 to move upward and downward (arrows A, B) to contact the uppermost article 103 and pick up the uppermost article 103. The suction mechanism 109 is slidably mounted on a guide bar mechanism 117 such that after the suction mechanism 109 picks up the uppermost article 103, the suction mechanism 109 can be moved by way of a hydraulic, pneumatic or other actuator/control device (e.g., screw feed, rack and pinion, etc.) in a direction indicated by the arrow C so as to convey the suction mechanism 109 along with the picked up article 103 to a position near a conveyor 119. The suction mechanism 109 then releases the vacuum so as to drop the picked up article 103 onto a surface 110 and then it slides into a bin 175 being carried by the section conveyor 119.

The above operation continues with the suction mechanism 109 continuously moving in directions C and D and directions A and B to continuously pick up an uppermost article 103 from the shelf 107, and deliver the uppermost article 103 to a bin on the conveying mechanism 119 until the desired number of articles are loaded into the bin 175 on the conveyor 119. Once a shelf is empty, it is replenished by an attendant, or if plural shelves are provided, the next shelf is presented while the attendant replenishes the empty shelf. Each of the elements described above including the stack conveyor mechanism 105, the suction mechanism 109 and section conveyor 119 can be mounted on a frame 121. After the articles 103 slide into the bin or tote 175 on the section conveyor 119, they can be conveyed in a desired direction by a bin or tote 175 which is designated for a retailer.

Figure 11:
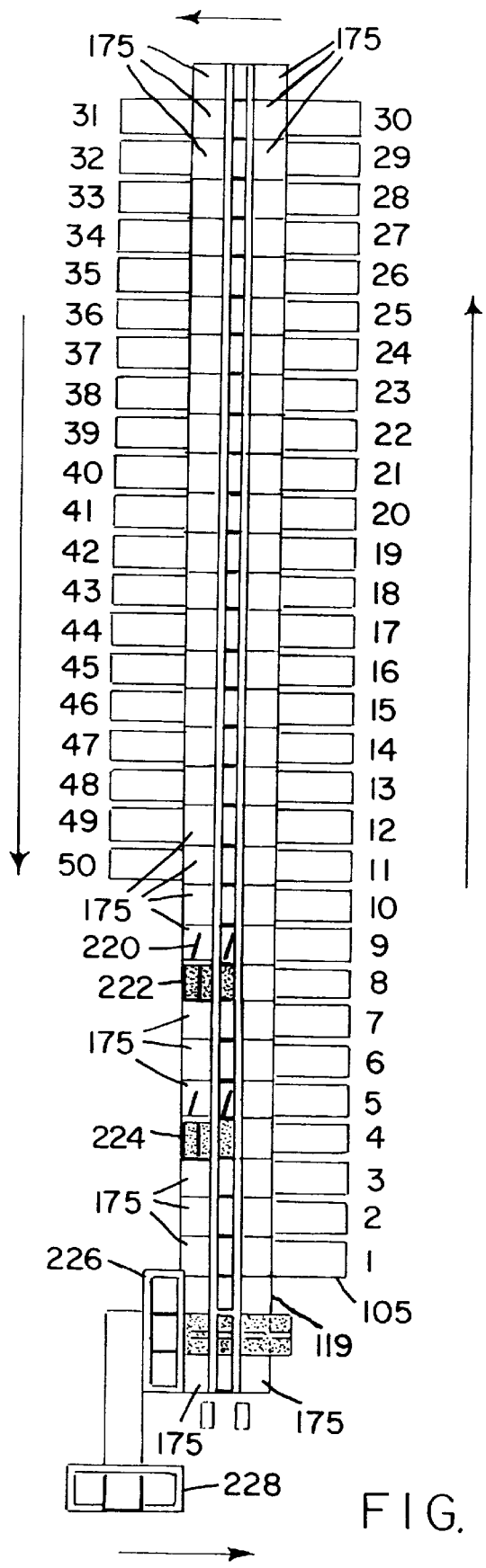
FIG. 11 is a schematic view of a group of picking machines forming one section of picking machines.

An article picking machine as describe above is provided at each of plural magazine supply stations or title locations, with each supply station or picking station being designated to a particular magazine or article. The section conveyor 119 can convey bins or totes 175 successively past each of the supply stations in which the article picking machine of the present invention is utilized as illustrated in FIG. 11, with each bin or tote 175 being designated to an order for a particular retailer. When a bin 175 arrives at a supply station, the number of magazines of that type which are required for a particular order are transferred from the supply one-by-one by way of the article picking machine as described above, until the correct number of magazines (i.e., of that type for that order) have been loaded into the bin 175 by the use of the article picking machine of the present invention. The bin 175 then progresses to a next station and the process is repeated for the next magazine type. Since different retailers require different numbers of magazines of various types, a control unit is utilized to coordinate the counting and transfer of the magazines at each supply/picking station such that each bin will ultimately have the retailer's desired number of magazines of each type.

Thus, a plurality of magazine picking machines as illustrated in FIG. 1 form a plurality of supply stations, each for delivering the desired number of particular type of magazine for each retailer. Each magazine supply station can include the article picking machine described above, and the stack conveying mechanism which thus includes a plurality of vertically movable shelves 107. The shelves 107 carry a stack of articles or magazines 103, and the suction device 109 transfers the top article or magazine from the stack on the top shelf onto the bin 175, until the bin contains a desired quantity.

Figure 2:
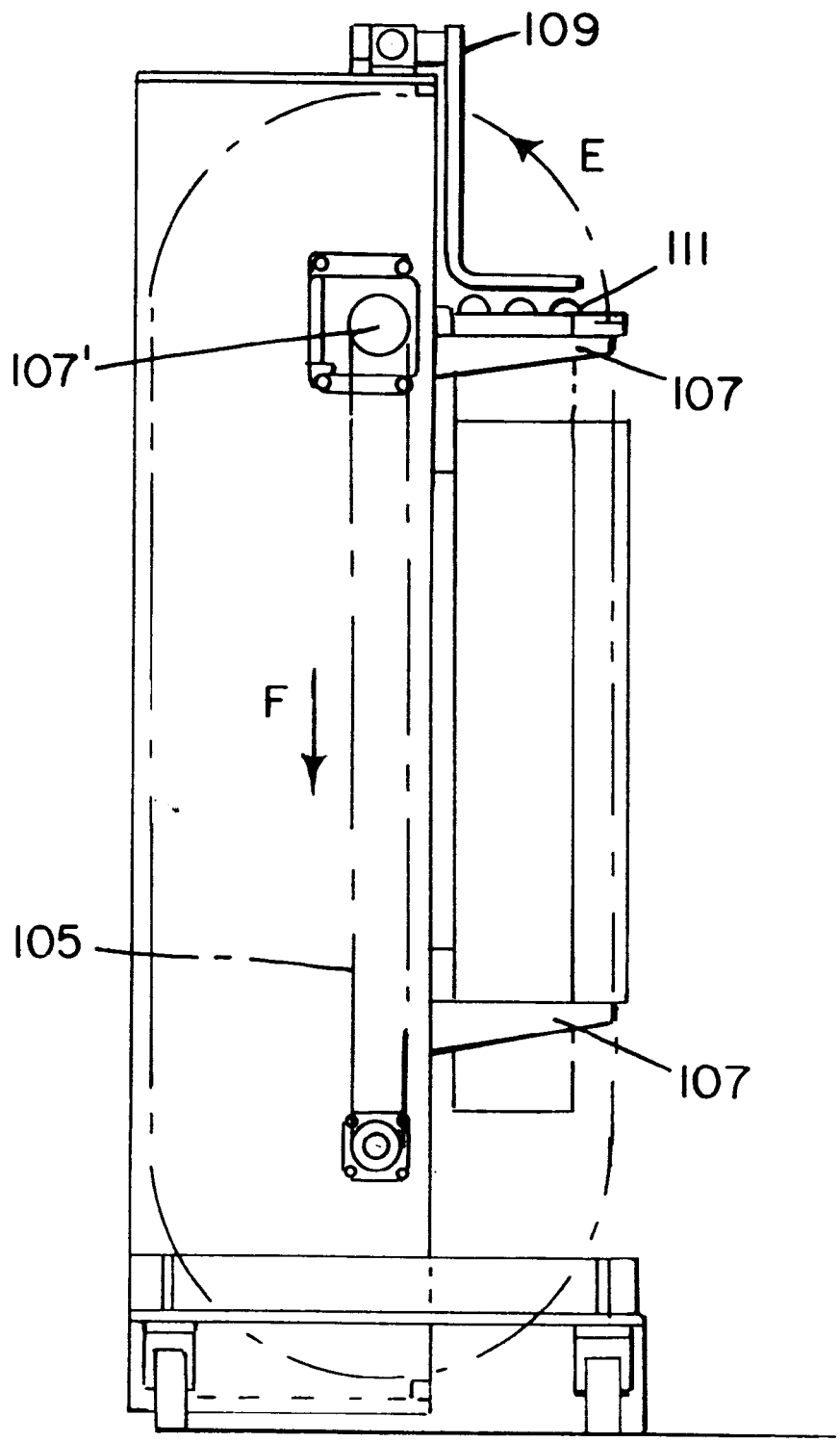
FIG. 2 depicts an embodiment for a stack conveying mechanism, with movable horizontal shelves for conveying a stack of articles for retrieval by a picking machine.
Figure 3:
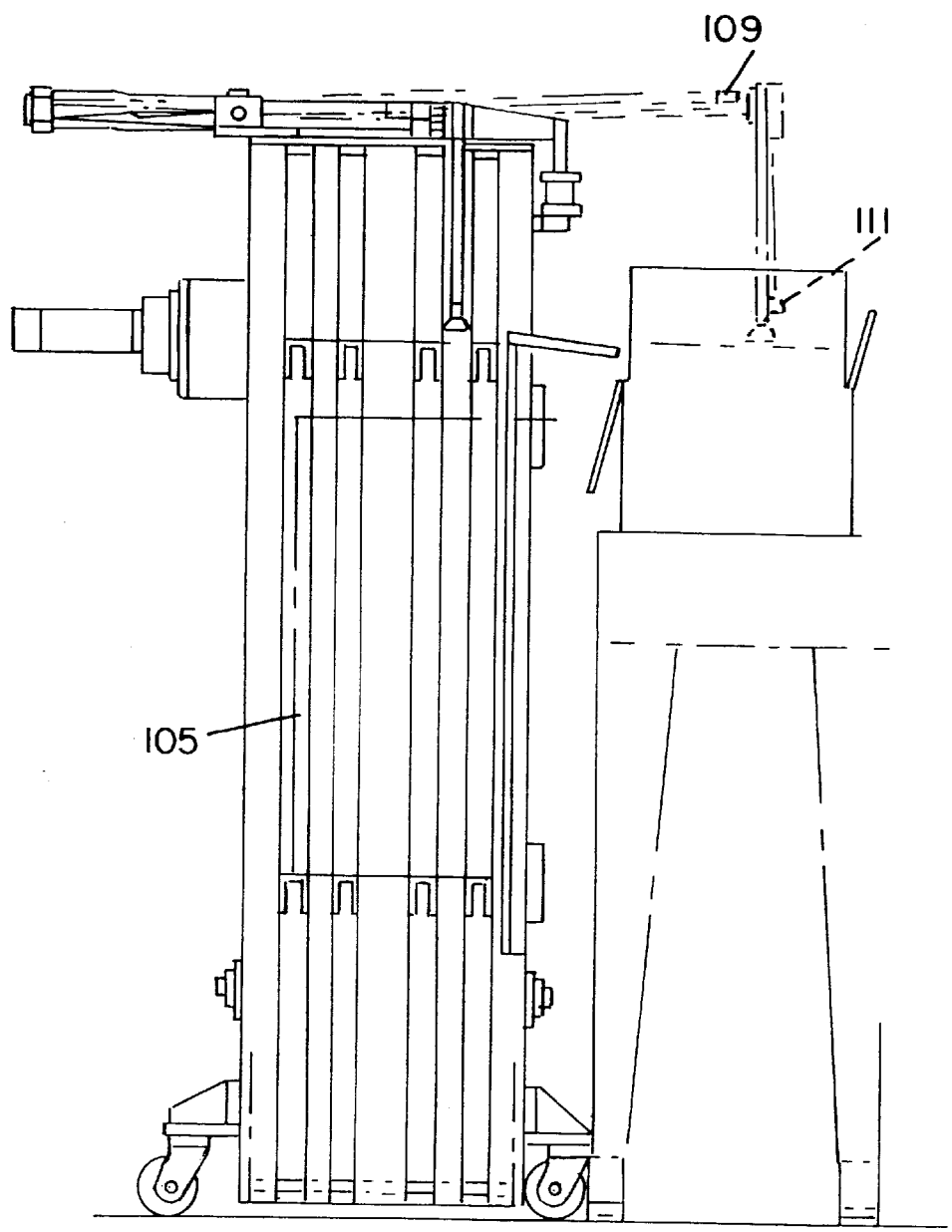
FIG. 3 is a further view of the article picking machine of FIG. 2.
Figure 4:
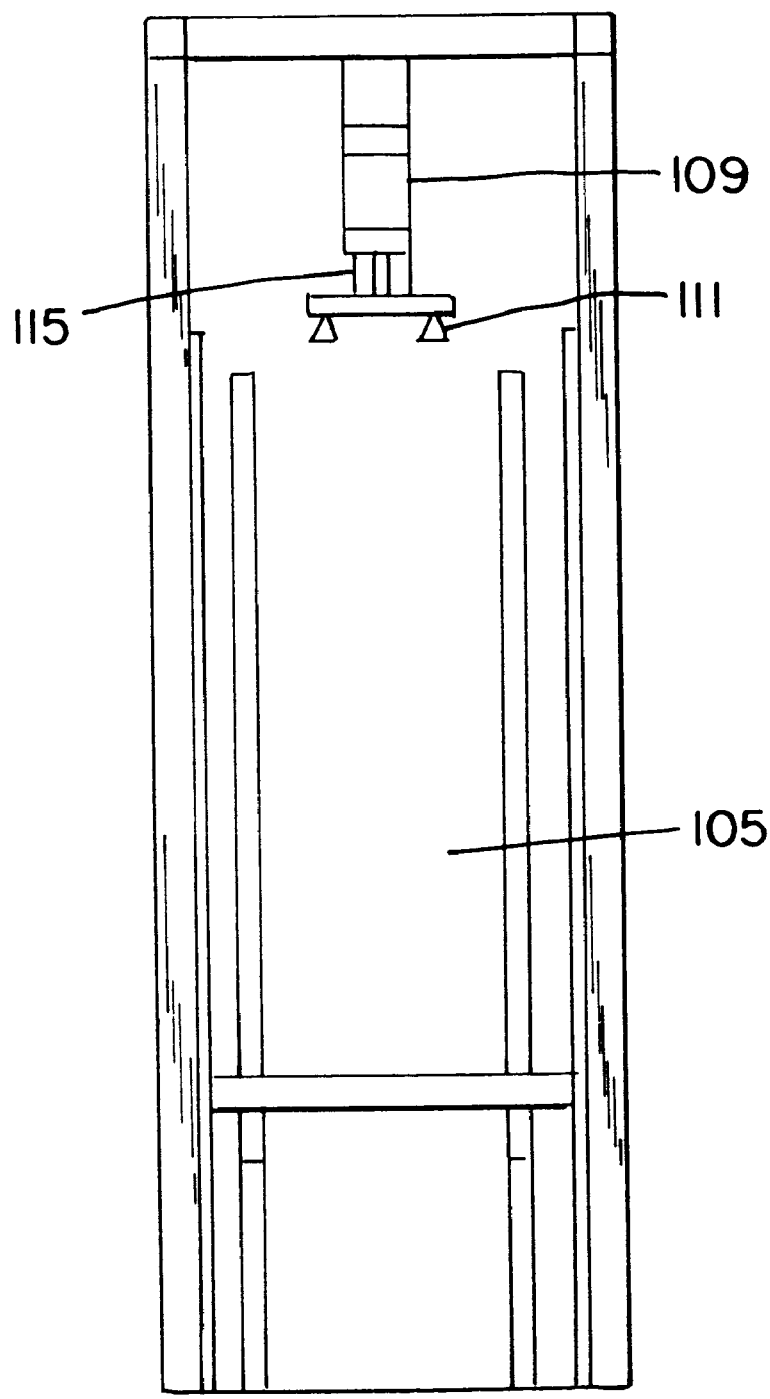
FIG. 4 is a rear view of the article picking machine.

In an alternate embodiment of the stack conveying mechanism as illustrated in FIG. 2, each of the shelves 107 can be pivoted about a point 107' along the direction E from a horizontal position to a vertical position. This pivoting occurs after the shelf 107 has been emptied by the suction mechanism 109. When the shelf 107 is empty, it is pivoted along the direction E to a vertical position, and then transported downward in direction F to the lower portion of the shelf conveyor mechanism 105 so as to be loaded again with further articles or magazines. This provides for an efficient and rapid method of continuously loading articles or magazines onto the shelves 107. With the FIG. 2 embodiment, once the stack of the top shelf has been depleted, the shelf pivots from a horizontal orientation to a vertical orientation, to provide access to the magazines disposed on a succeeding shelf. The succeeding shelf moves up to the position previously occupied by the depleted shelf. The depleted, vertically oriented shelf then moves down along the side or back of the assembly while remaining vertically oriented. Once the depleted shelf 107 reaches the bottom of the assembly, the shelf returns to the horizontal orientation so that it can be loaded with a new supply of magazines. Thus, the transfer or picking operation need not be halted for replenishment of the magazine supply. Other embodiments may be used to effect the non-halting supply aspect of the invention, which could include a series of shelves built into a cylindrical carousel device having an axis of rotation substantially perpendicular to the ground. In such an embodiment the suction mechanism 109 would remove articles 103' from one of the shelves, while the other shelves could be refilled with articles 103'. Once a stack is depleted, the carousel rotates to present a succeeding stack.

Figure 6:
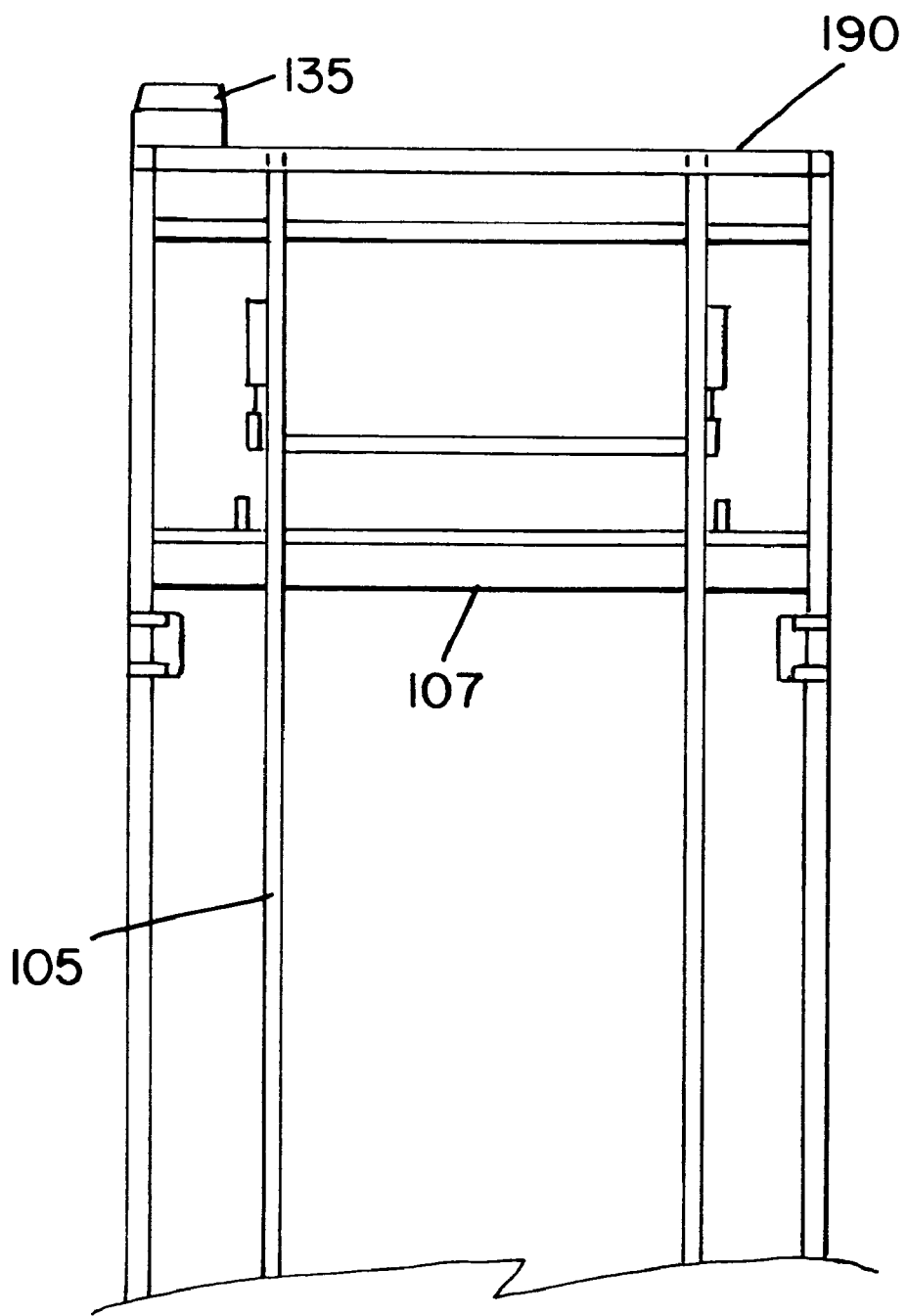
FIG. 6 depicts the frame for an alternate embodiment the stack conveying mechanism of the article picking machine.
Figure 7:
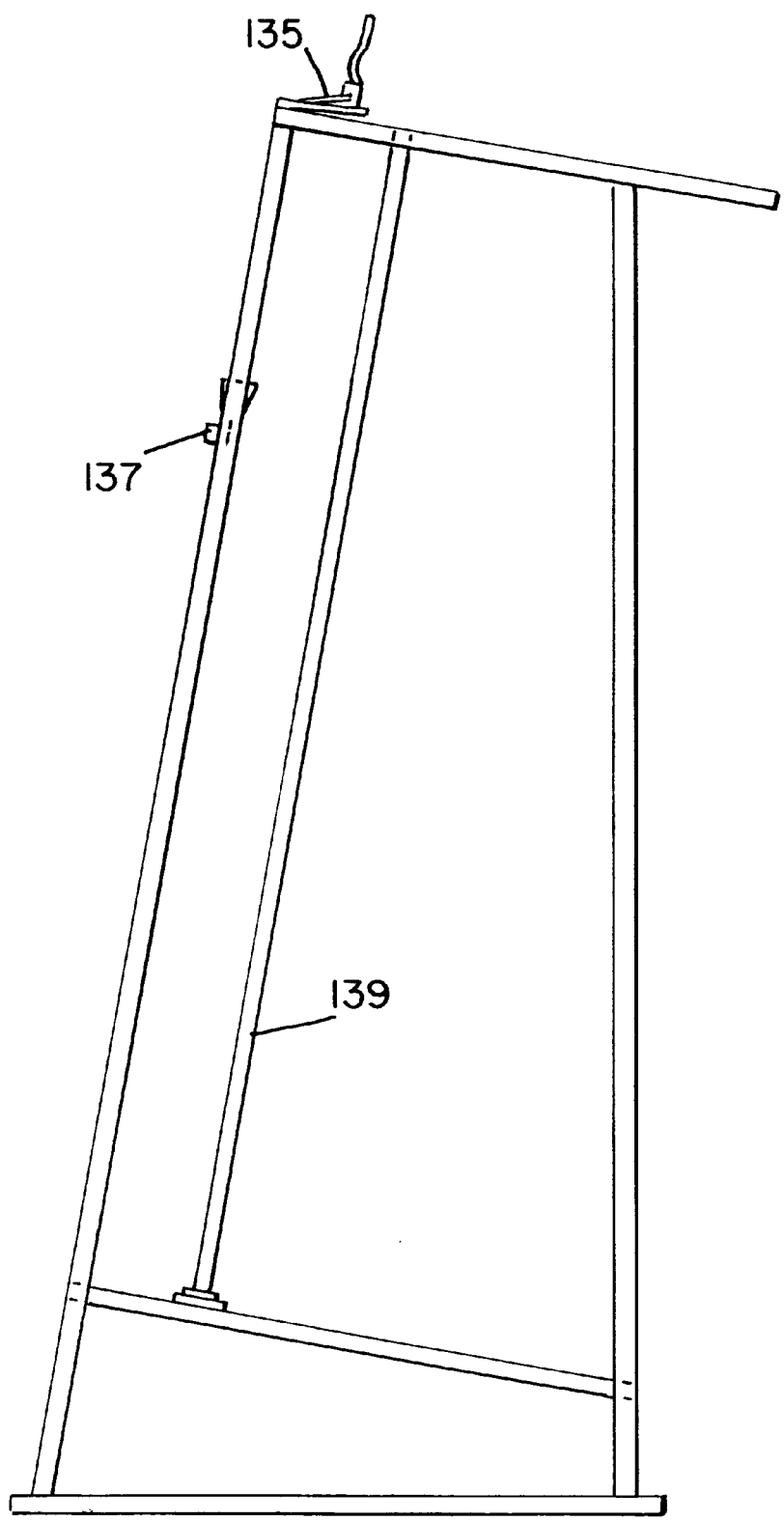
FIG. 7 is a side view of the frame of the conveying mechanism of FIG. 6.

FIGS. 6 and 7 depict a further alternate embodiment of the stack conveying mechanism which includes a frame 190 for the stack conveying mechanism 105. As shown in FIG. 6, an optical shelf presence sensor 135 is provided at the top of the frame 190 which cooperates with reflective tape (not shown) placed at a bottom surface of the shelf 107. The optical shelf presence detector 135 detects light reflecting off of the reflective tape when the shelf 107 is empty. The optical shelf presence sensor 135 is connected to the picking machine computer 185. FIG. 7 illustrates a side view of the frame 190 of the shelf conveyor mechanism 105 including the optical shelf presence sensor 135 and a cam spring element 137 which activates a micro-switch or limit switch type of device which is connected to the motor of the stack conveying means 105. As the shelf 107 moves along a guide rod 139, the shelf 107 pushes back and keeps pushed back the cam spring element 137. When the shelf 107 has risen so far up so as to have its lowest surface pass by the cam spring element 137, the cam spring element 137 expands or pushes out, since the shelf 107 is no longer present to keep the cam spring element 137 depressed. The signal generated by the actuation of the cam spring element 137 causes the motor of the stack conveyor means 105 to reverse direction, thus causing the shelf 107 to lower and thus be filled with articles 103.

Figure 8:
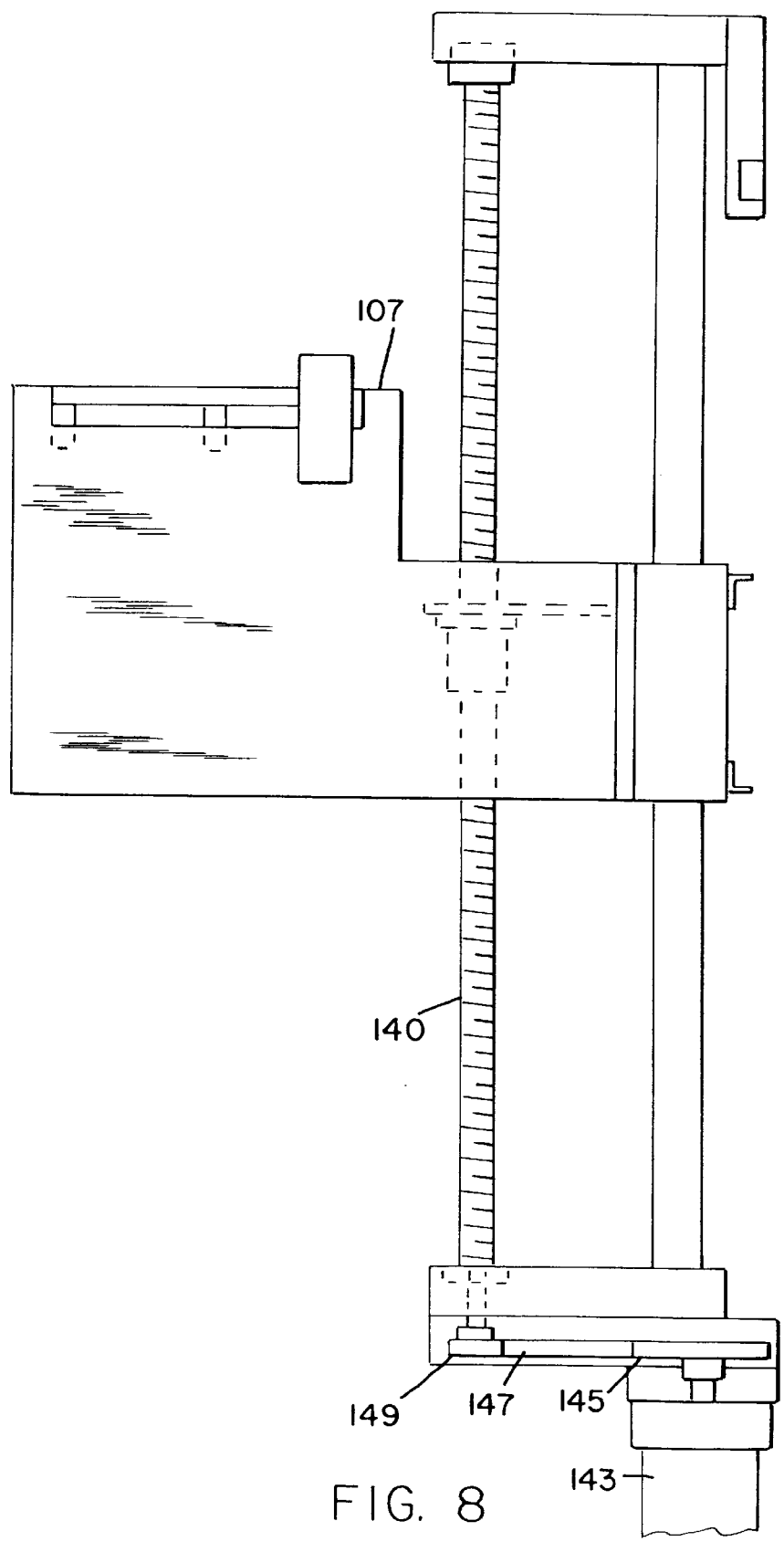
FIG. 8 is yet a further embodiment of a stack conveying mechanism and the mechanism for moving a shelf or tray of articles for retrieval by the article picking machine.

FIG. 8 shows a still further embodiment of a stack conveyor mechanism in which the shelf 107 rises along a guide screw 140, which may be a ball screw type shaft or threaded shaft. Motor 143 rotates a gear 145 and a belt 147, to in turn rotate a further gear 149. This causes the guide screw shaft 140 to rotate and lift the shelf 107.

FIG. 9A shows a top view of the guide bar mechanism 117 for sliding the suction mechanism 109 from a position where it picks up an article to a position where it drops the article near the section conveyor 119. FIG. 9B is a side view of FIG. 9A. As illustrated in FIG. 9B, the guide bar mechanism 117 includes guide rods 117A, 117B which permit the suction mechanism 109 to slide therealong. The guide rods 117A, 117B can include springs 160A, 160B which act as a stop for the suction mechanism 109. The sliding guide bar assembly 117 also includes a stop 163 at the area where the suction mechanism 109 moves to pick up an article 103.

As illustrated in FIG. 9B, the suction mechanism 109 can include a cylinder arrangement 167 which can serve to move a vacuum assembly 169 up and down so as to pick Up an article 103. The suction mechanism 109 further includes an assembly 106 which is slidably positioned on the rods 117A, 117B so as to permit a sliding movement of the suction mechanism 109. As a further feature, the rods 117A, 117B can be ball screw type rods which are rotated by a motor and have gears that engage with interior gears on the assembly 106, to permit the movement of the suction mechanism 109 as the ball screw rotates. As discussed above, the stack of articles is successively indexed with the stack conveying mechanism so that the article movement of the suction device remains constant. It is also possible to vary the stroke of the suction device, so that as a stack is depleted, the suction device moves further downward to retrieve the top article from the depleted stack. However, a fixed vertical stroke suction device and stack conveying mechanism arrangement is presently preferred.

Figure 10:
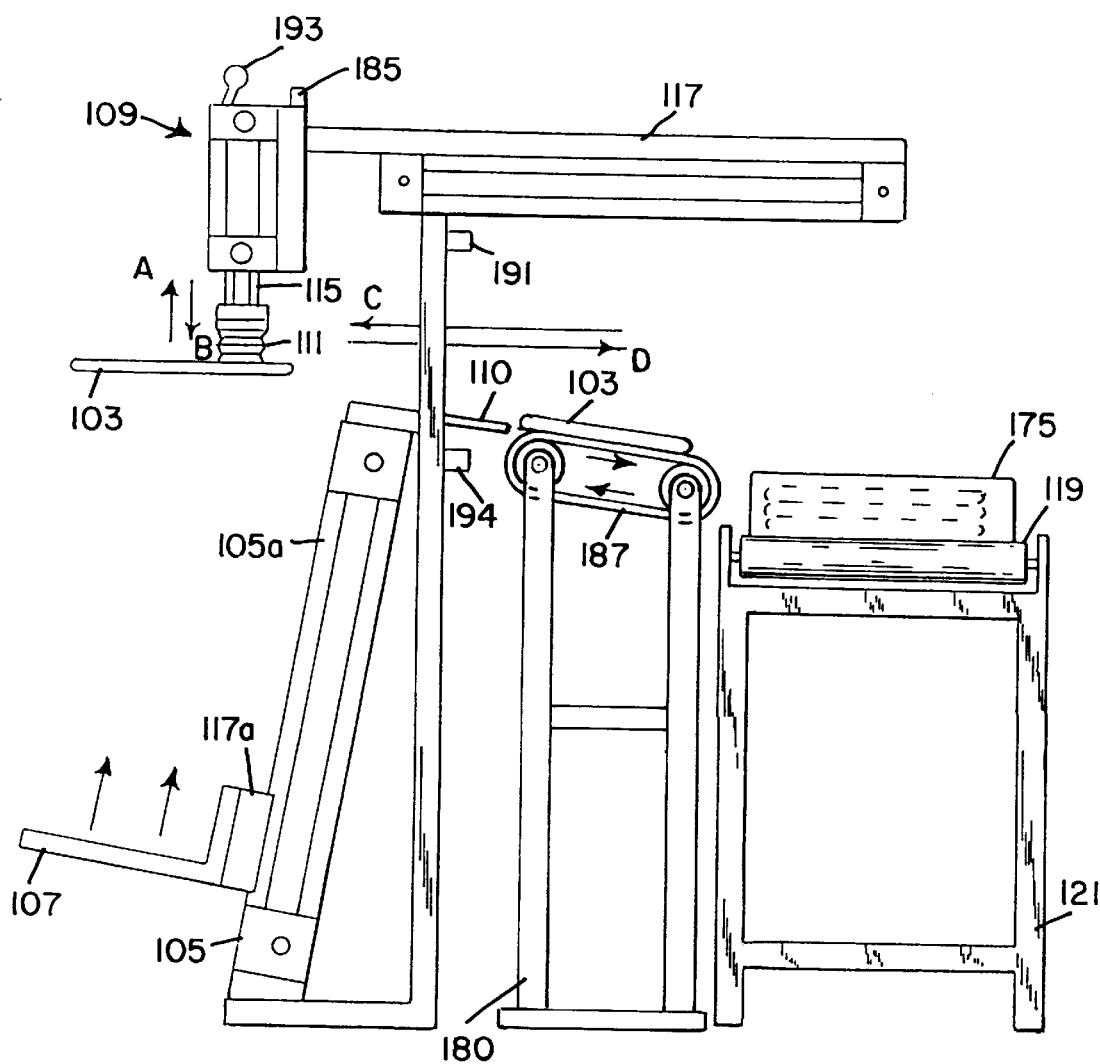
FIG. 10 depicts the picking machine of FIG. 1 having a belt drive interposed between it and the section conveyor.

In an alternate embodiment of the picking machine set-up illustrated in FIG. 1, is shown in FIG. 10. FIG. 10 illustrates the use of a belt 187 mounted to a belt frame 188 to help transport the article 103 from the picking machine surface 110 to the bin 175. The belt 187 helps to ensure that the article 103 is forcefully transported into the bin 175. The belt 187 also makes it possible to span large distances between the picking machine and the bin 175. The arrows shown in FIG. 10 near the belt 187 indicate the direction of rotation of the belt 187. When the assembly section of picking machines is energized, by the section computer 220, the belt 187 of each picking machine runs continuously at a constant speed.

Any number of picking machines may be used in practice. FIG. 11 depicts a group of fifty picking machines, each numbered 1–50, respectively, forming an assembly section. The arrows around the figure indicate the direction of motion of the section conveyor 119 (which is provided inside of the picking machines). FIG. 11 also schematically illustrates a group section computer 220 which coordinates the picking machines 1–50, section conveyor 119, printers 222 and 224, bundlers 226 and 228, and the location of the containers or bins 175.

Figure 12:
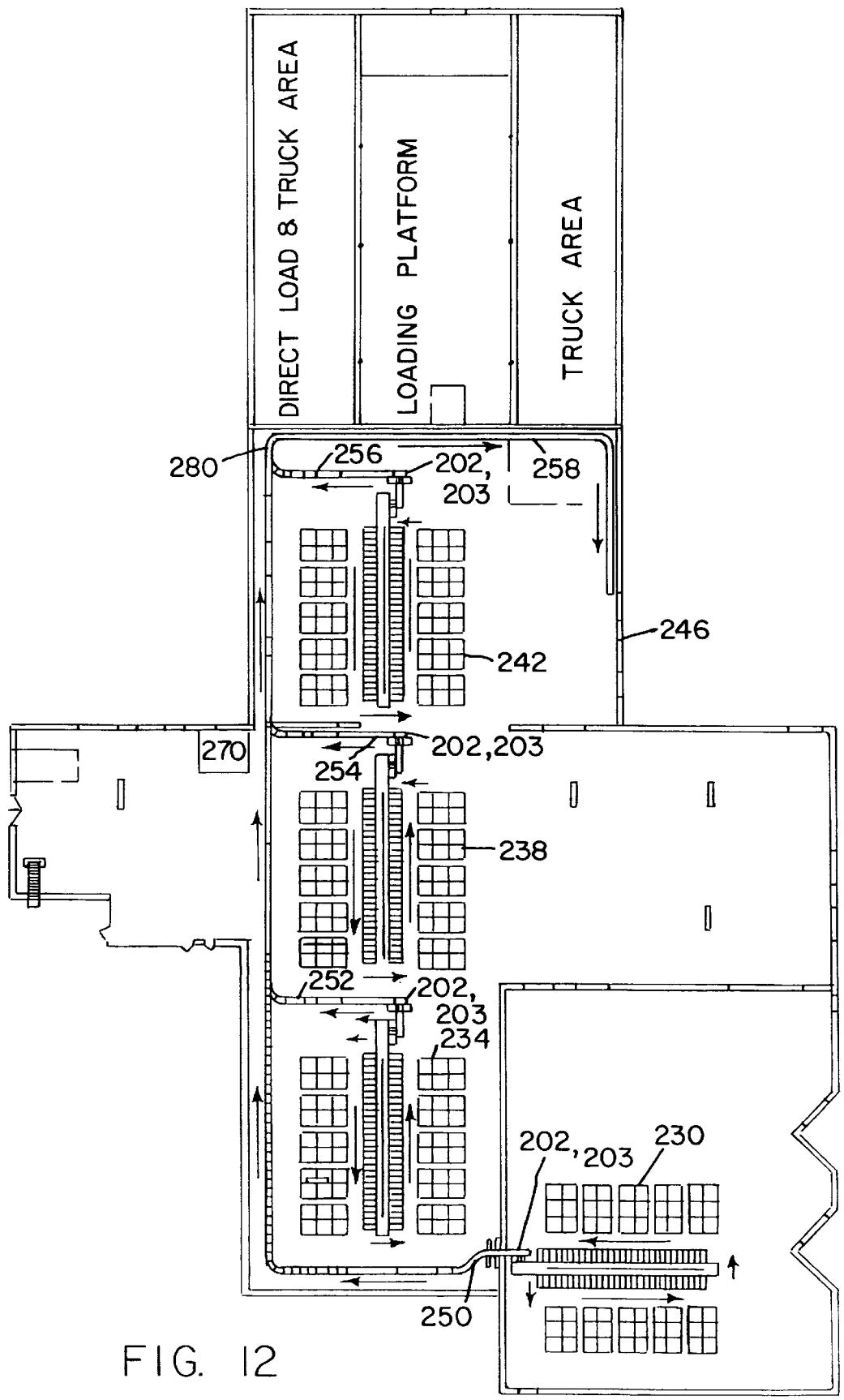
FIG. 12 is a plan view or plant layout which includes plural assembly sections of picking machines.

The retailers' orders are input into the system computer 270 (shown in FIG. 12). The retailers' orders are then correlated to the predetermined retailers' route stop sequence, which was previously input into the system computer 270. The route stop sequence is the sequence of stops, in order, that the delivery person makes when they deliver the bundles to the retailers. Thus, the retailers' orders are then downloaded into the group section computer 220 from the system computer 270 in the reverse order of the delivery person's route stop sequence, so that the retailers' orders are delivered from the delivery truck in the proper order. The group section computer 220 sends a signal out to each title location or picking machine 1–50, commanding each picking machine to pick-up a designated number of articles 103. As discussed earlier, each bin 175 is designated or assigned to one retailer. If a retailer is to receive a large order, more than one bin 175 may be assigned to one retailer. In particular, during entry of the retailer's order, if the number of articles required by an the order from one section of picking machines exceeds the number of articles that can fit in a bin 175, then the retailer is assigned two bins 175, or as many bins 175 as are required. The system assigns the required number of bins 175, based upon the height of magazines, which is input by an operator after measuring the height of magazines with a caliper, to a retailer's order based upon knowledge of the size of the retailer's order. Once all of the commands have been fulfilled each bin 175 indexes to the next title location. Then the section computer 220 downloads the retailer's order to each picking machine 1–50 thus starting the process over again.

In a present form of the invention, the section conveyor 119 runs continuously. Each picking machine has a pneumatic cylinder (not shown) that stops the container or bin 175 at the picking machine to receive its allotment of articles 103, while the section conveyor 119 continues to run. The group section computer 220 sends a signal to each pneumatic cylinder of every picking machine, which extends the solenoid of the hydraulic cylinder so as to stop the container 175 or retracts the solenoid of the hydraulic cylinder so as to allow the container 175 to move to the next picking machine location. If desired, the section conveyor could be indexed by the computer 220, however, the use of stopping devices is presently preferred.

Each title location or picking machine has its own dedicated computer 185 which commands the suction mechanism 109 to move and which checks to determine if it did move, by way of an optical article sensor 191 (shown in FIG. 1). The section computer 220 downloads to the picking machine computer 185 how many titles to pick. Since not all retailers desire all of the titles in an assembly section when the bin is indexed to the next picking machine, no article may be selected if that is what the retailer's order calls for, then the computer will command that no articles be picked at that particular picking machine. The optical article sensor 191 determines if the suction mechanism 109 moved an article 103. If an article 103 does move-by the optical article sensor 191 then the operation of this system continues as normal. If an article 103 was not sent past the optical article sensor 191, then the optical article sensor 191 sends a signal to the picking machine computer 185 which in turn sends a signal to the group section computer 220. The group section computer 220 sends a signal back to the picking machine computer 185, which in turn commands an annunciation light 193 to illuminate. The illumination of the annunciation light 193 on top of the picking machine indicates to an operator that the picking machine needs to be serviced. When the annunciation light 193 is illuminated it indicates that more articles 103 need to be put on the tray 107 or that the operator needs to indicate to the group section computer 220 that that particular retailers order will be short by the number of titles not picked. In such a situation, the group section computer 220 automatically determines the number of articles 103 picked and adjusts the retailer's invoice automatically if the operator so enters the command as prompted on the screen of group section computer 220.

If the optical shelf presence sensor 135 indicates that the tray 107 is empty, the optical shelf presence sensor 135 sends a signal to the picking machine computer 185 that there are no articles 103' on tray 107. The picking machine computer 185 in turn sends a signal to the annunciation light 193 on top of the picking machine that blinks. The blinking light 193 indicates to the operator that there are no 103 on the tray 107 and is in need of refilling. When the operator refills the shelf or tray 107 the annunciation light 193 stops blinking.

After each container 175 has been filled with the number of articles 103 commanded by the group section computer 220, the group section computer 220 commands each pneumatic cylinder of each picking machine 1–50 to release its associated container or bin 175 so as to index the container 175 to the next picking machine 1–50 in the section. The group section computer 220 then commands each pneumatic cylinder of each picking machine 1–50 to interact with the associated container 175 so as to retain the container 175 at the next appropriate picking machine 1–50. An optical bin sensor 194 (as shown in FIG. 1) checks to determine if each container or bin 175 moved from one title location or picking machine to the next picking machine. The process of filling the next sequence of titles for each retailer's orders continues, as discussed above.

When a container 175 exits picking machine number 50 as shown in FIG. 11, that particular container is complete and ready to be bundled. The container or bin containing the, either full or partial, order continues to travel on the section conveyor 119 until it reaches the printer 222 which prints out the packaging slip, which details the contents of the container 175. The container 175 continues on to printer 224. Printer 224 places an invoice on top of the contents in the container 175. Both printers 222 and 224 are controlled by the group section computer 220.

After the container 175 exits the location of the invoice printer 224 it continues on until the contents of the container 175 are ejected from the container 175 and placed in a first bundler 226 which wraps a strap around the bundle in one orientation after it ejects the contents of the container 175. The bundle then continues toward a second bundler 228 to be strapped in a second orientation orthogonal to the first wrap. Both bundlers 226 and 228 are controlled by the group section computer 220. As each bundle leaves the section it is tracked by an optical section output sensor and scanner 202, 203 which determines if the bundle has gone by and reads the information off the printed invoice, as shown in FIG. 12.

Figure 13:
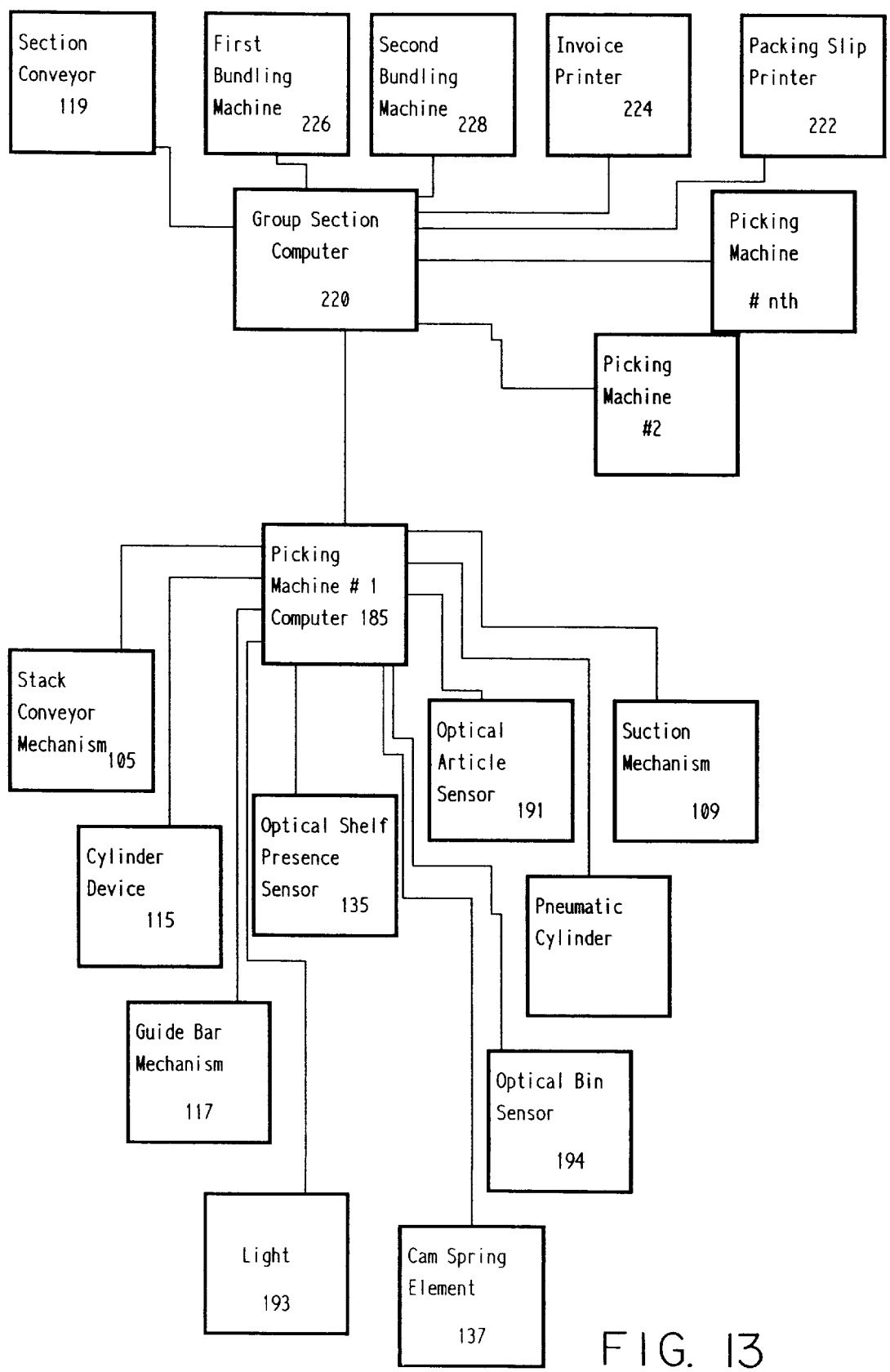
FIG. 13 is a block diagram of an assembly section.

FIG. 13 is a block diagram of the assembly section as shown in FIG. 11 including the group section computer 220, printers 222 and 224, bundlers 226 and 228, section conveyor 119, and picking machines 1 through n, where n=50. Additionally, FIG. 13 includes the block diagram for a single picking machine which contains its various sensors 135, 137, 191, 194, actuation devices 105, 115, 117 (including the pneumatic cylinder used to release/stop bins 175, not shown in FIGS. 1–12), suction devices 109, and annunciation light 193, however, the assembly section can contain a plurality of picking machines. Shown as an example are the connections between the group section computer 220 and printers 222 and 224, bundlers 226 and 228, and picking machines 1–50. Further illustrated are the connections between the picking machine computer 185 and the suction mechanism 109, optical shelf presence detector 135, cam spring element 137, optical article sensor 191, light 193, optical bin sensor 194, and pneumatic cylinder (not shown in FIGS. 1–12), shelf conveyor mechanism 105, cylinder device 115, and guide bar mechanism 117.

Figure 14A:
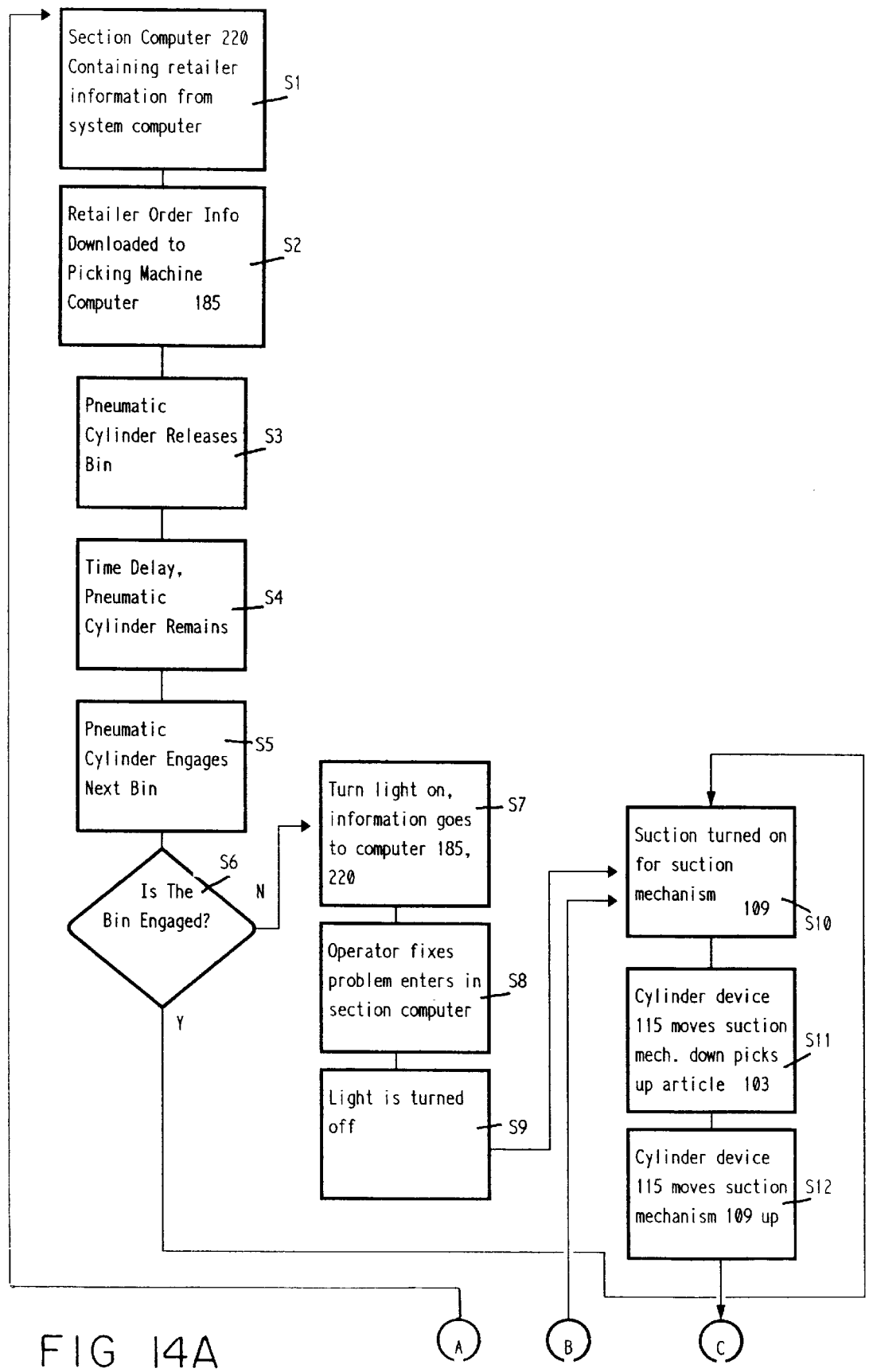
FIGS. 14A and 14B are flow charts depicting the operation of a picking machine joined at the common circled junctures A, B and C.
Figure 14B:
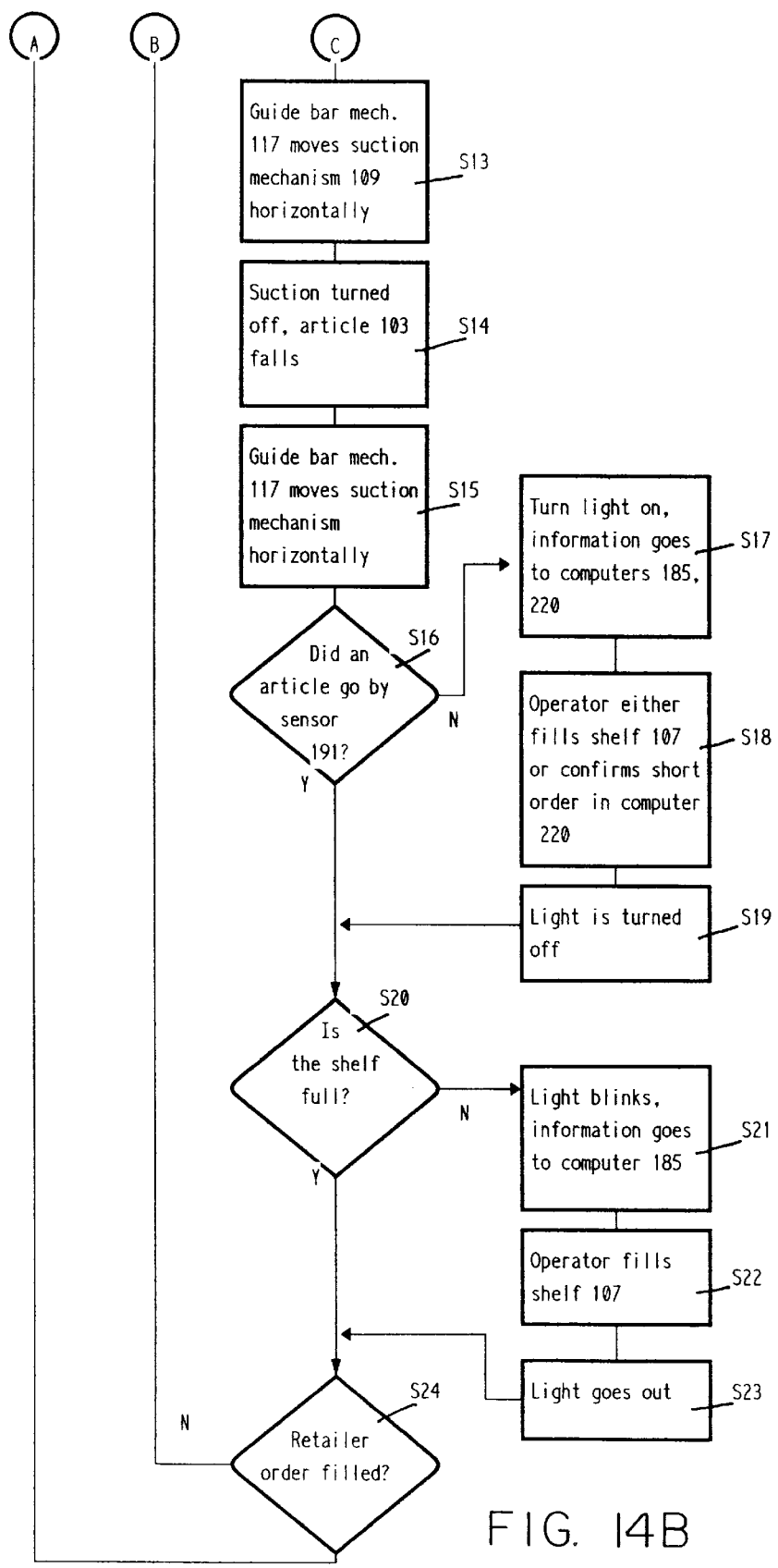

FIGS. 14A and 14B are a flow chart of one picking machine in operation, where the flow chart for the other picking machines in the assembly section are identical to the schematic shown. The circled A, circled B, and circled C at the bottom of FIG. 14A matchup with the circled A, circled B, and circled C at the top of FIG. 14B to form a single flow chart. The circled As, Bs, and Cs do not designate a function. FIG. 14A illustrates that the group section computer 220 receives retailer order information from the system computer 270 in step S1. The group section computer 220 then downloads the number articles to be picked for each bin 175, each of which may be different retailers, to the picking machine computers 185 in step S2. The picking machine computer 185 commands the pneumatic cylinder to release the bin 175 at the picking machine in step S3. The picking machine computer then has a time delay to provide enough time for the bin 175 to travel from picking machine to the next, it is also based on the size of the bin 175 in step S4. After the time delay, the picking station computer 185 commands the pneumatic cylinder to engage the next bin 175 in step S5.

An optical bin sensor 194 senses if the bin has been engaged or not by the pneumatic cylinder in step S6. If the next bin 175 has not been engaged then the optical bin sensor 194 sends a signal to the picking machine computer 185, the picking machine computer sends a signal to the section computer 220 and to an annunciation light 193 in step S7. An annunciation light 193 is turned on, thus alerting the operator to a problem. The operator then fixes the problem and re-enters the command on the section computer 220 in step S8. The section computer 220 sends a signal to the picking machine computer 185 and then the picking machine computer sends a signal to the light 193, thus turning it off in step S9. Then the picking machine computer 185 commands the suction or vacuum to be turned on for the suction mechanism 109 in step S10. Alternatively, at step S6, if the optical bin sensor 194 determines that the bin is engaged, then the picking station computer commands that the suction to the suction mechanism 109 be turned on in step S10.

Next, the picking machine computer 185 commands the cylinder device 115 to move the suction mechanism 109 downward so as to pick-up an article out of the shelf 107 in step S11. The picking machine computer 185 then commands the cylinder device 115 to move upward back to its original position in step S12. The picking machine computer 185 then commands the guide bar mechanism 117 to move the suction mechanism 109 horizontally towards the section conveyor 119 in step S13, as shown in FIG. 14B. The picking machine computer 185 then commands the suction to the suction mechanism 109 to be terminated, thus causing the picked-up article to fall and slide into the bin 175 in step S14. The picking machine computer 185 then commands the guide bar mechanism 117 to move horizontally back to its original position in step S15.

The optical article sensor 191 determines if an article passed by it in step S16. If an article did not pass by the optical article sensor 191, then the shelf 107 must be empty. If an article did not go by then the optical article sensor 191 sends a signal to the picking machine computer 185 and the picking machine computer 185 sends a signal to the section computer 220. The picking machine computer 185 then commands the annunciation light 193 to be turned on in step S17. The operator then either fills the shelf 107 with articles 103' or the operator confirms a short order in the section computer 220, and the section computer will then adjust the retailer's order accordingly in step S18. The section computer then sends a signal to the picking machine computer and the picking machine computer commands the annunciation light 193 to turn off in step S19. Alternatively, in step S16, if the article 103 did pass by the optical article sensor 191, then the picking station computer 185 checks to determine if the shelf 107 is full in step S20.

The shelf presence sensor 135 can determine if the shelf 107 is empty if light reflects off of reflective tape attached to the surface of the shelf 107 since no articles 103 are present on the shelf 107. If the shelf 107 is empty of articles 103, then the shelf presence sensor 135 sends a signal to the picking machine computer 185, which in turn commands the light 193 to blink in step S21. The operator then fills the shelf 107 in step S22, which causes the shelf presence sensor to send a signal to the picking machine computer 185 that articles 103 are present in the shelf 107, then the picking machine computer 185 commands the light 193 to turn off in step S23. Alternatively, if the shelf is not empty then the picking machine computer 185 moves on to the next step.

The picking machine computer then determines if the retailer's order is filled, in step S24. If the retailer's order is not filled, then the process starts over where the suction mechanism 109 starts to pick another article for the same bin or container 175 in step S10. If the retailer's order is filled, the process starts at the beginning with the section computer 220 downloading the next retailer's order into the picking machine's computer 185 as in step S2.

Figure 15:
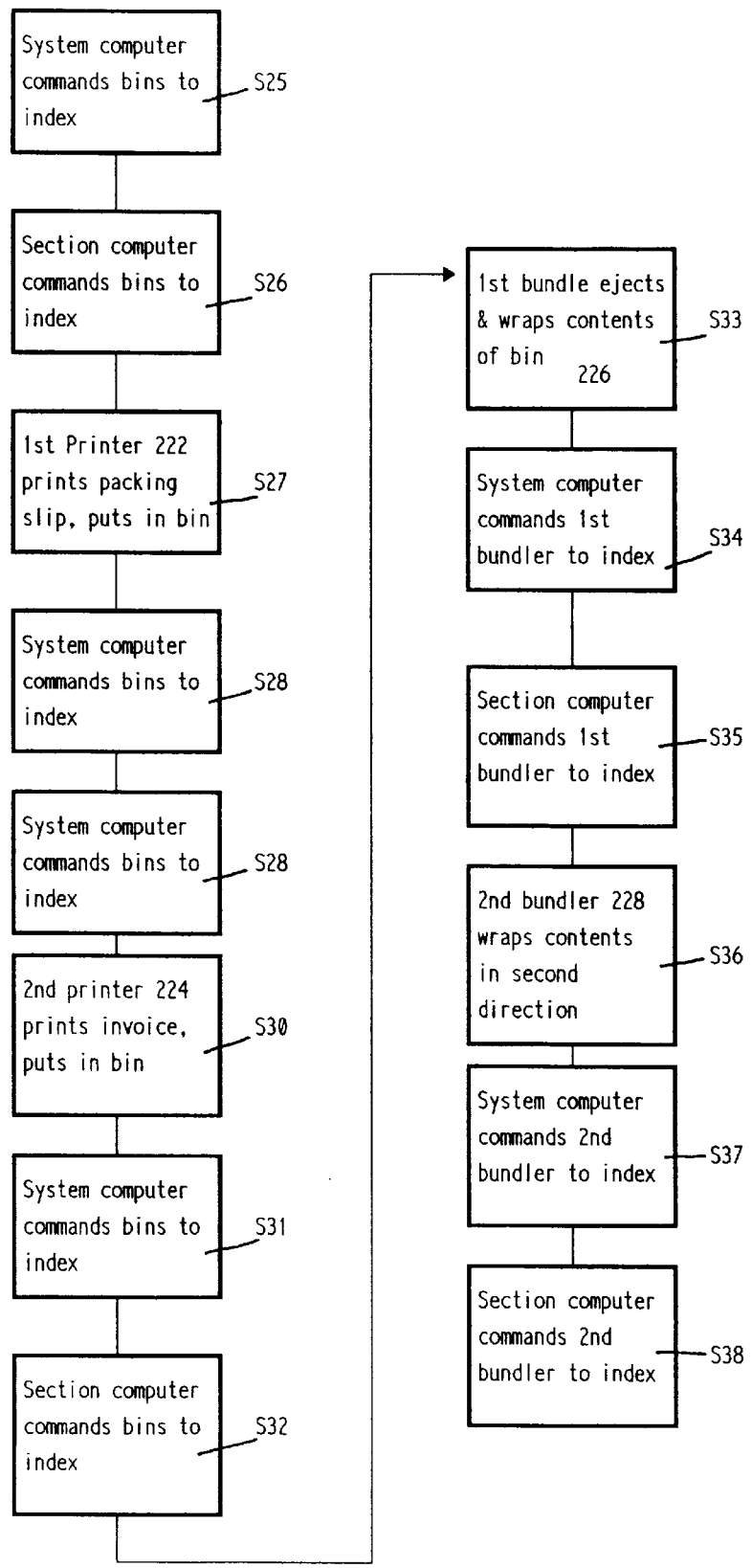
FIG. 15 is a flow chart of the printing and bundling operations of an assembly section.

FIG. 15 is a flow chart of the printing and bundling operations performed on the contents of a bin 175 after the bin 175 has exited the last picking machine station 50 and before the bundle passes by the section output sensor and scanner 202, 203. The system computer 270 commands, in step S25 the section computers 220 to index the bins 175, in step S26, one bin of which exits the last picking machine. That bin then indexes towards the first printer 222 which prints a packing slip of the contents of the bin and places it in the bin in step S27. The system computer 270 then commands, in step S28, the section computers 220 to index the bins in step S29. The one bin then indexes towards the second printer 224 which prints an invoice of the contents of the bin and places it in the bin in step S30. The system computer 270 then commands, in step S31, the section computers 220 to index the bins in step S32. The one bin then enters the first bundler 226 which ejects the contents of the bin and wraps the contents of the bin in one orientation in step S33. The empty bin is then recycled around the section conveyor 119 heading towards the first picking machine 1 to start the filling processes all over. The system computer 270 then commands, in step S34, the section computer 220 to command the first bundler 226 to transport or index the bundle to the second bundler 228 in step S35. The once wrapped bundle enters the second bundler 228 where the bundle is wrapped in a second orientation orthogonal to the first direction in step S36. The system computer 270 then commands, in step S37, the section computer 220 to have the second bundler 228 transport or index, in step S38, one of the system conveyors 250, 252, 254 or 256 where it will pass by section output sensor and scanner 202, 203.

The overall layout of the plant is shown in FIG. 12. Four assembly sections 230, 234, 238, and 242, of titles are shown. Each assembly section 230, 234, 238 and 242, accommodate 50 titles each. FIG. 11 is the detailed view of a single assembly section. Also shown is the palletizing area 246. A system computer 270 controls and monitors the section computers of each assembly section 230, 234, 238 and 242, along with the associated system conveyors 250, 252, 254 and 256, and the accumulation area 280. Also shown in FIG. 12 is the location where trucks unload articles to be organized. The route person's delivery truck is loaded near the palletizing area 246.

FIG. 12 also shows the circulation of bins 175 within each assembly section 230, 234, 238, 242 indicated by arrows. The circulation of bundles on the system and final conveyors 250, 252, 254, 256, 258 are shown by arrows situated adjacent to each conveyor assembly.

A single retailer's bundle from each of the assembly sections 230, 234, 238 and 242, leave at approximately the same time and are read by the associated section output sensors and scanners 202, 203, respectively, if a single retailer has, as a either their entire order or a part of their order, a bundle from each assembly section. Otherwise, it is possible that the bundles leaving each assembly section 230, 234, 238 and 242, belong to the orders of four different retailers. Furthermore, it is possible that a retailer has two or more consecutive bundles issued from a single assembly section. In such cases the route stop sequence between the bundles must be maintained so that, at the palletizing area 246, the bundles are loaded into the delivery truck in the proper order.

The information read by each section output sensor and scanner 202, 203 associated with each assembly section 230, 234, 238 and 244 is transferred to the system computer 270. Each bundle issued by each assembly section 230, 234, 238, and 242, travel down their associated system conveyors 250, 252, 254 and 256, where each bundle eventually reaches an accumulation area 280. The accumulation area 280 exists so that each bundle of the retailer's order may accumulate near each other, whether the bundles are from the same assembly section or different assembly sections, so that when the bundles of the retailer's order are deposited at the palletizing area 246 they are in order. The accumulation area 280 has a length of approximately thirty feet.

Figure 16:
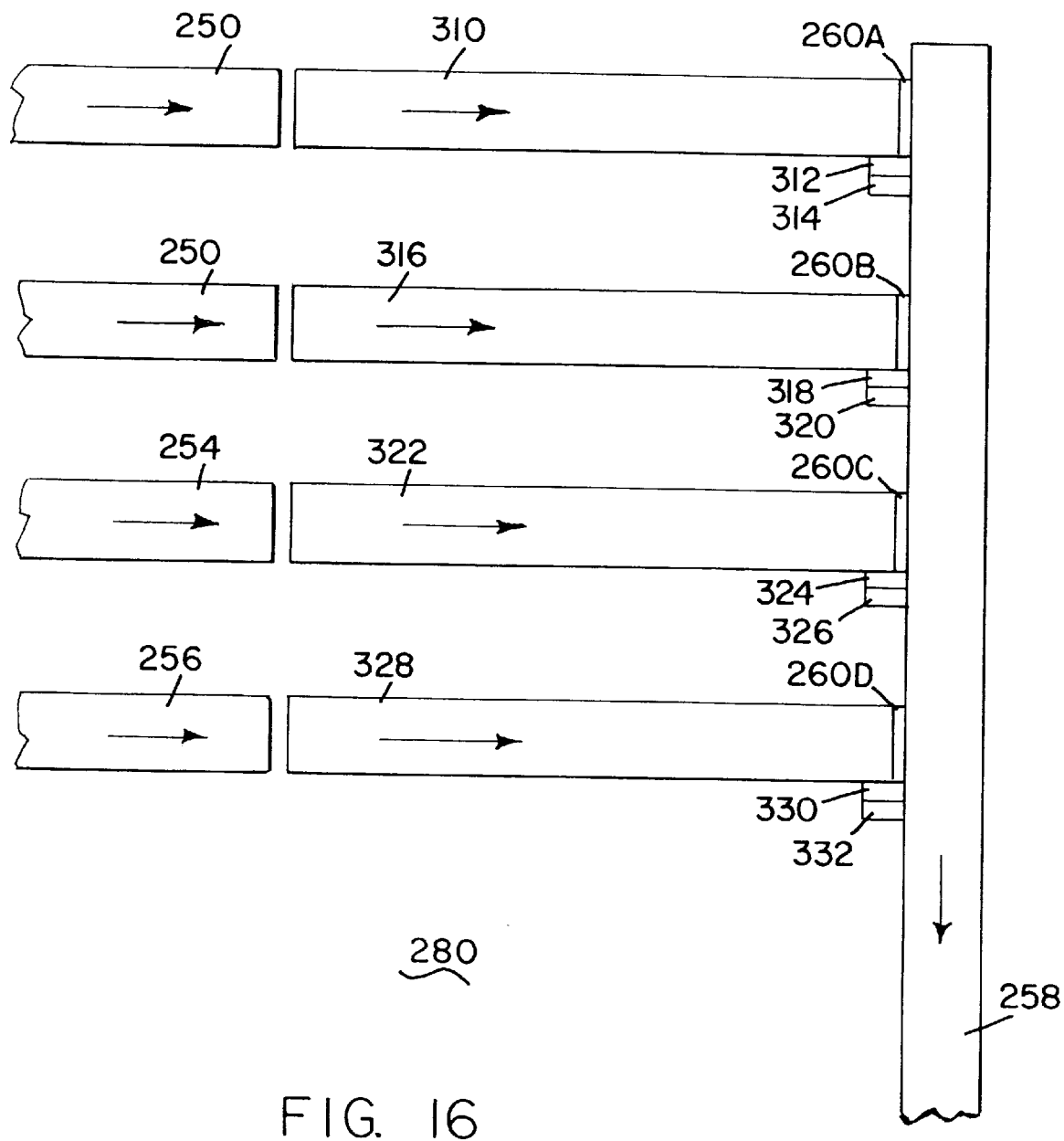
FIG. 16 is a partial view of an accumulation area that services plural assembly sections.

FIG. 16 is a view of the accumulation area 280. The system conveyors 250, 252, 254 and 256 propel the respective retailer's bundle toward accumulation conveyors 310, 316, 322, 328. FIG. 16 makes clear that the system conveyors 250, 252, 254, 256 leading up to the accumulation area 280 are four separate conveyors and not one single conveyor. The accumulation conveyors 310, 316, 322, 328 do not run continuously, but are indexed by the system computer 270. The arrows in FIG. 16 indicate the direction of motion of the conveyors and hence the direction of motion of the bundles. Each accumulation conveyor 310, 316, 322, 328 indexes the bundles toward their respective gates 260A–D, which, in a closed state, prevent the bundles from being introduced to the final conveyor 258. Once a bundle is stopped at a gate 260A–D, the respective gate sensors 312, 318, 324, 330 determine that a bundle is present, then the respective gate scanners 314, 320, 326, 332 scan the invoice of each bundle. The scanned invoice data is compared to the stop route sequence. As an example, if the bundle at gate 260B belongs to the retailer currently occupying the route stop sequence position, then the system computer 270 commands the gate 260B to open and the accumulation conveyor 316 indexes, thus, depositing the bundle on the constantly running final conveyor 258. The gate 260B then closes while the bundle heads towards the palletizing area 246.

When the accumulation conveyor 316 indexes it brings onto the accumulation conveyor 316 the next bundle which is waiting at the output end of the system conveyor 252. Once again, the gate scanners 314, 320, 326, 332 send the scanned invoice data of each bundle to the system computer 270 for comparison with the current route stop sequence position to be filled. If the retailer has one bundle, then, after the example given above, the system computer 270 would look for the bundle belonging to the next retailer in the route stop sequence. However, if the retailer, as discussed above, had a second bundle behind its first bundle on the same accumulation conveyor 316, then the gate scanner 320 would send this information to the system computer 270 and the system computer 270 would command, after comparing the invoice data to the route stop sequence, the gate 260B to open and then it would command the accumulation conveyor 316 to index, thus, releasing the next bundle onto the final conveyor 258. However, the sequence could exist where the retailer, as discussed above, also has bundles issued from other assembly sections. In such a case, a bundle or bundles of the retailer would be resting against one or all of the other gates 260 A, C, D, the gate scanners 314, 326, 332 would scan the invoice of each bundle at the respective gates, and then, as above, the system computer 270 would have the bundle placed on the final conveyor 258, if the bundle or bundles were next on the route stop sequence.

The gates 260A–D ensure that each bundle associated with accumulation conveyors 310, 316, 322 and 328 remain at the gates 260A–D until the proper route stop sequence has been achieved. The gates 260A–D are actuated by respective pneumatic cylinders (not shown) which are controlled by the system computer 270. Thus, the correct sequence of bundles for the retailer's order are then transported to the palletizing area 246. At the palletizing area 246 each of the bundles are assembled together and readied, to be introduced onto the delivery truck. Each retailer's order is transferred to the delivery truck in sequence. The sequence of retailers' orders ensures that when the delivery person unloads the next available retailer's order out of the truck that it is coordinated with each route stop of the delivery person.

Figure 17:
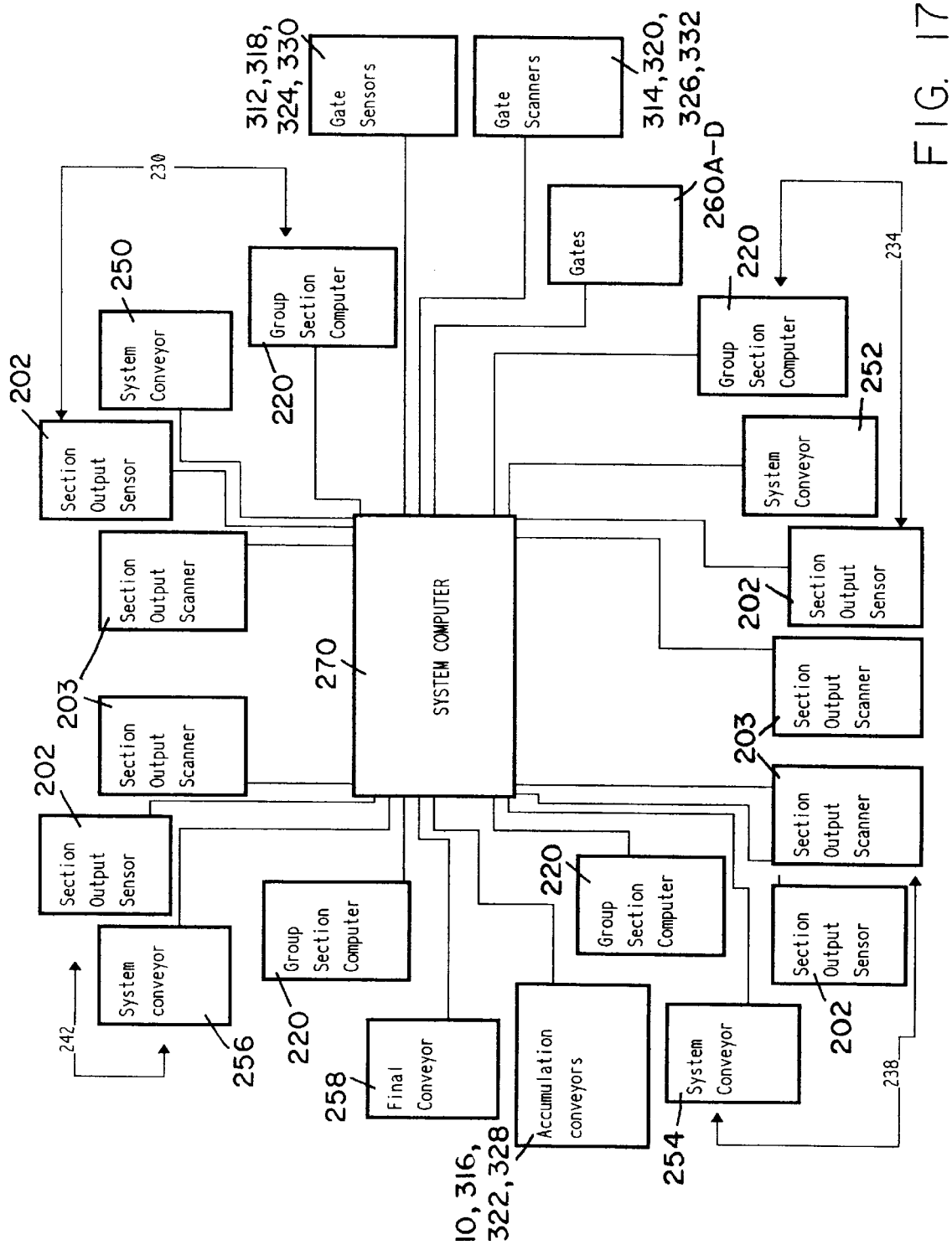
FIG. 17 is a block diagram of the overall system.

FIG. 17 is a block diagram of the overall system including the system computer 270 connected to system conveyors 250, 252, 254, 256, accumulation conveyors 310, 316, 322, 328, gate sensors 312, 318, 324, 330, gate scanners 314, 320, 326, 332, gates 260A–D, final conveyor 258, and for each section 230, 234, 238, 242, are shown section output sensors and scanners 202, 203 and group section computers 220. Not shown are the devices attached to the group section computers 220, such devices are illustrated in FIG. 13. The system computer 270 commands the system conveyors 250, 252, 254, 256, and final conveyor 258 to move. However, similar to the section conveyors 119, the system and final conveyors 250, 252, 254, 256, 258 remain in a moving state when the system is in operation, even when the gate 260 is closed. The system and final conveyors 250, 252, 254, 256, 258 are also constructed similarly to the section conveyor assemblies 119. Furthermore, the accumulation conveyors 310, 316, 322 and 328, index in response to commands from the system computer 270 due to the correlation or matching-up of data scanned by the gate scanner 314, 320, 326 and 332, from their associated bundles to the data found in the route stop sequence stored in the system computer 270.

Figure 18A:
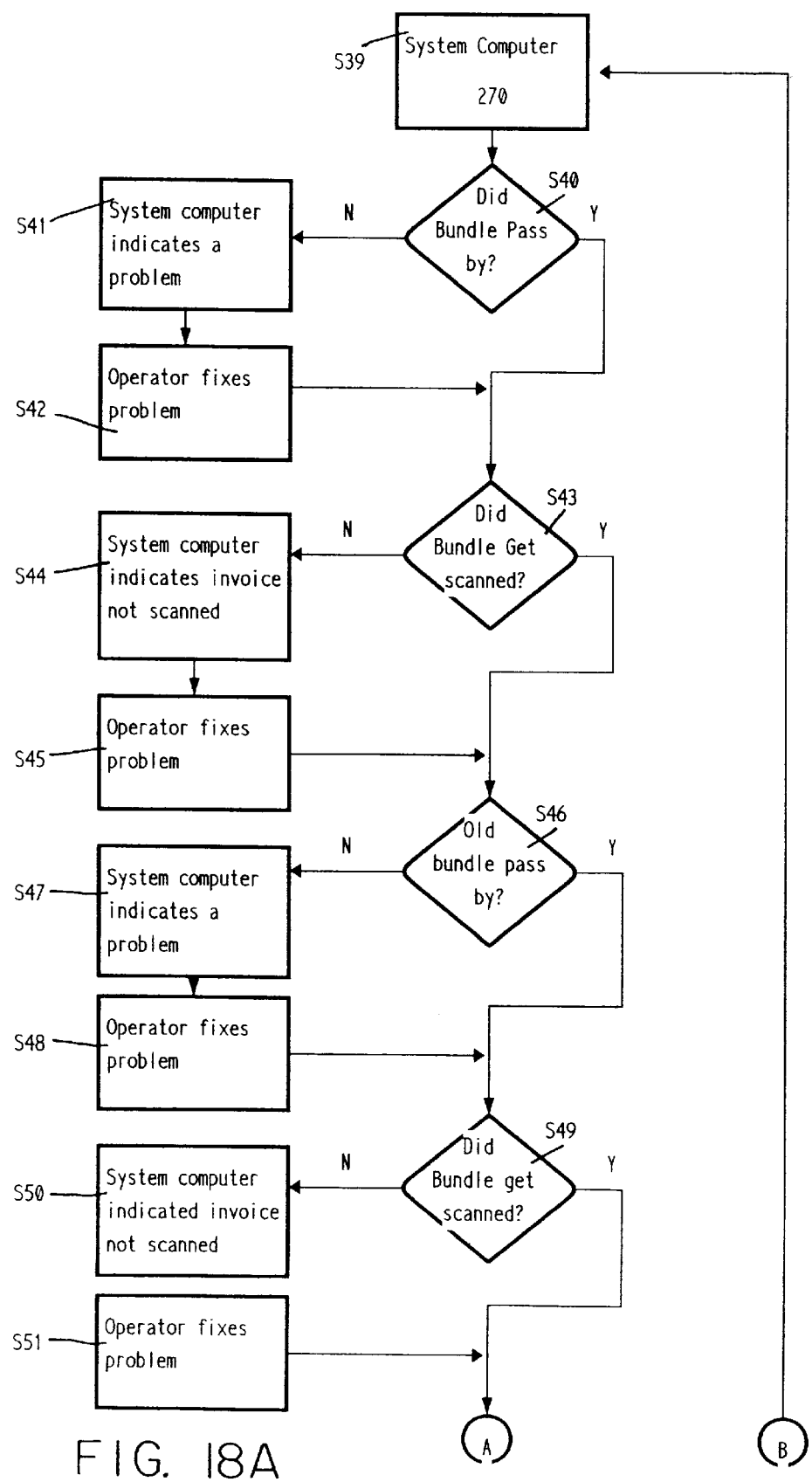
FIGS. 18A, 18B 18C 18D, 18E and 18F are a flow chart joined at their respective circled junctures A-B, C-D, E-F, G-H, and I-J, illustrating the logic operating the overall system or plant.
Figure 18B:
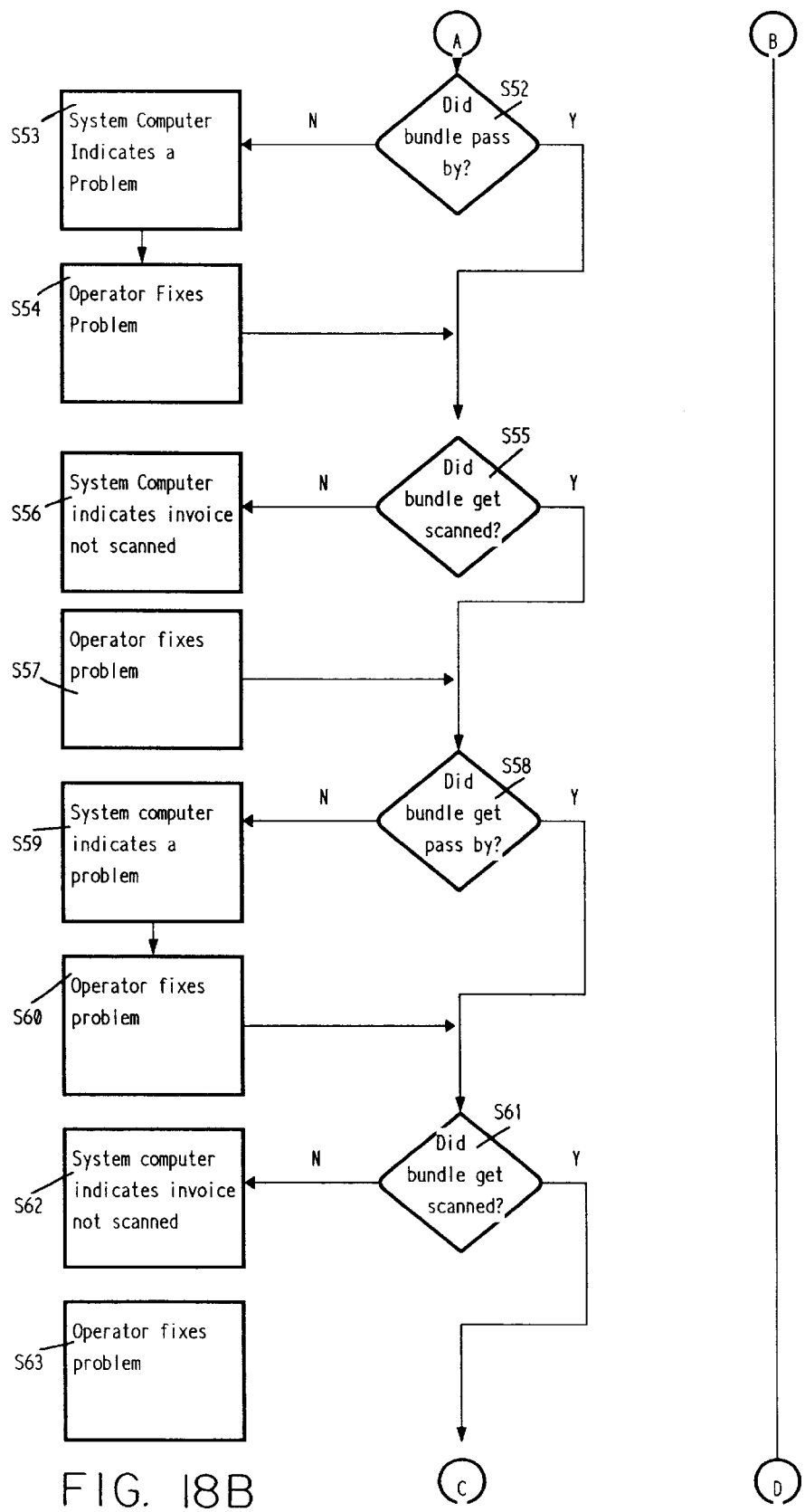
Figure 18C:
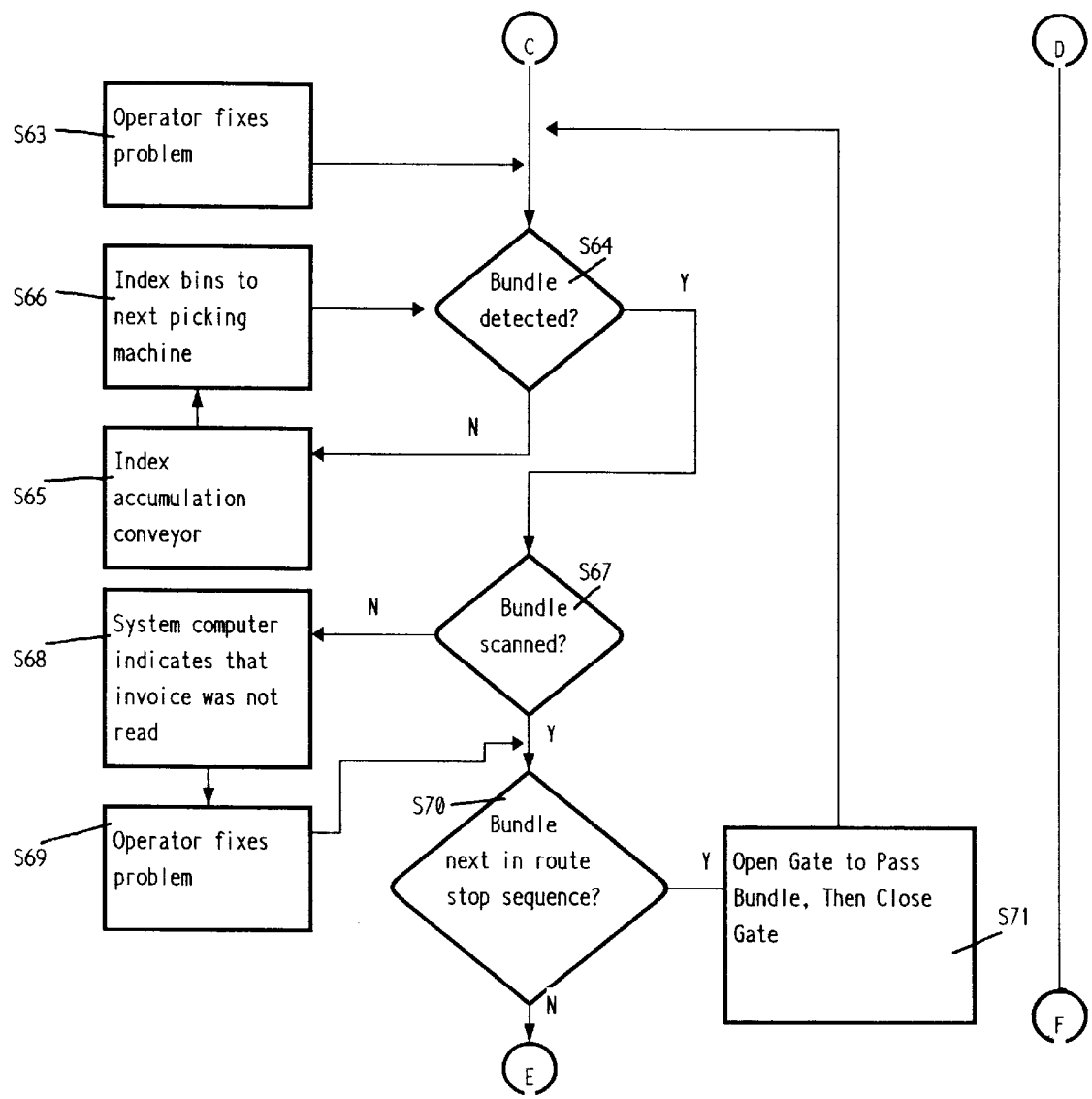
Figure 18D:
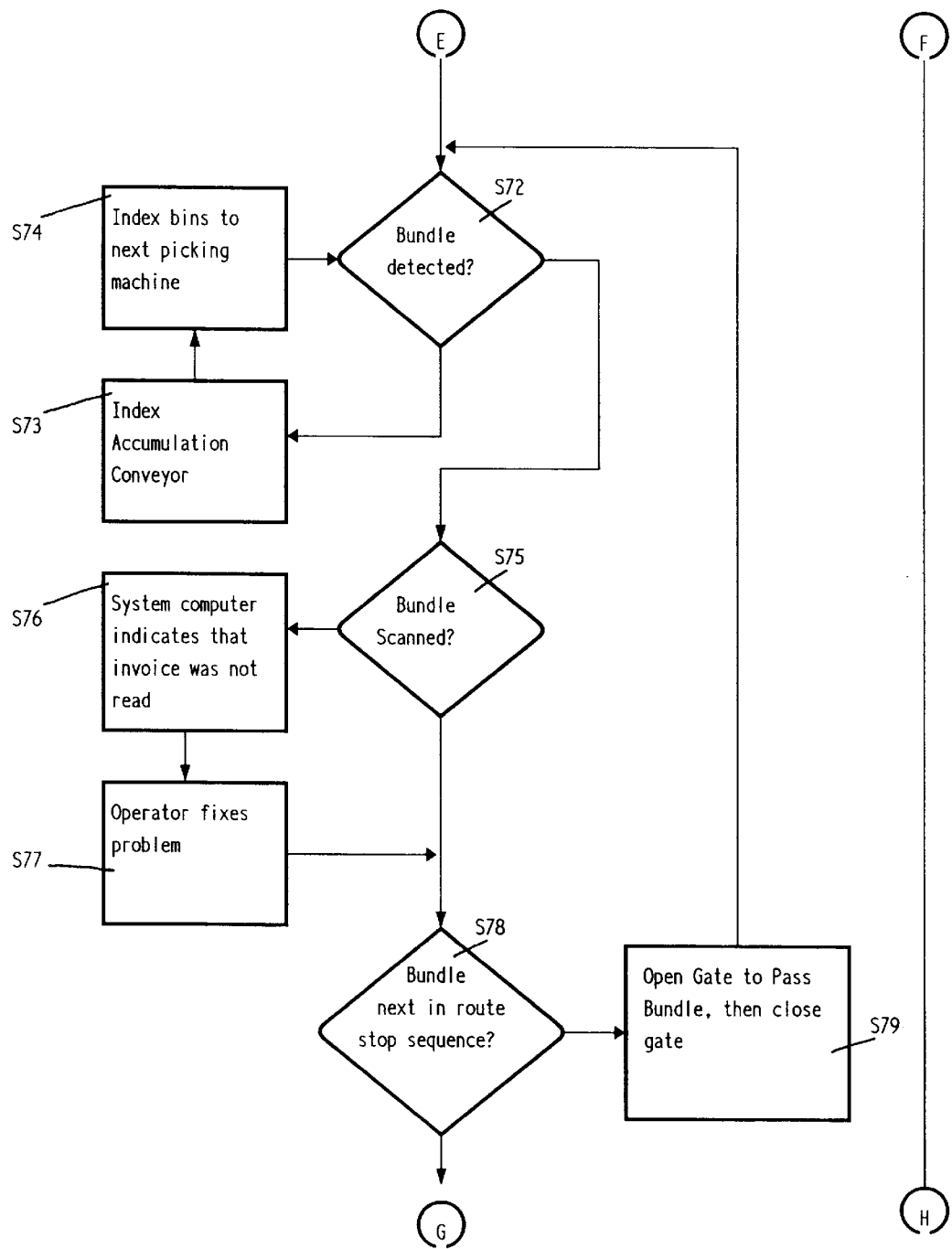
Figure 18E:
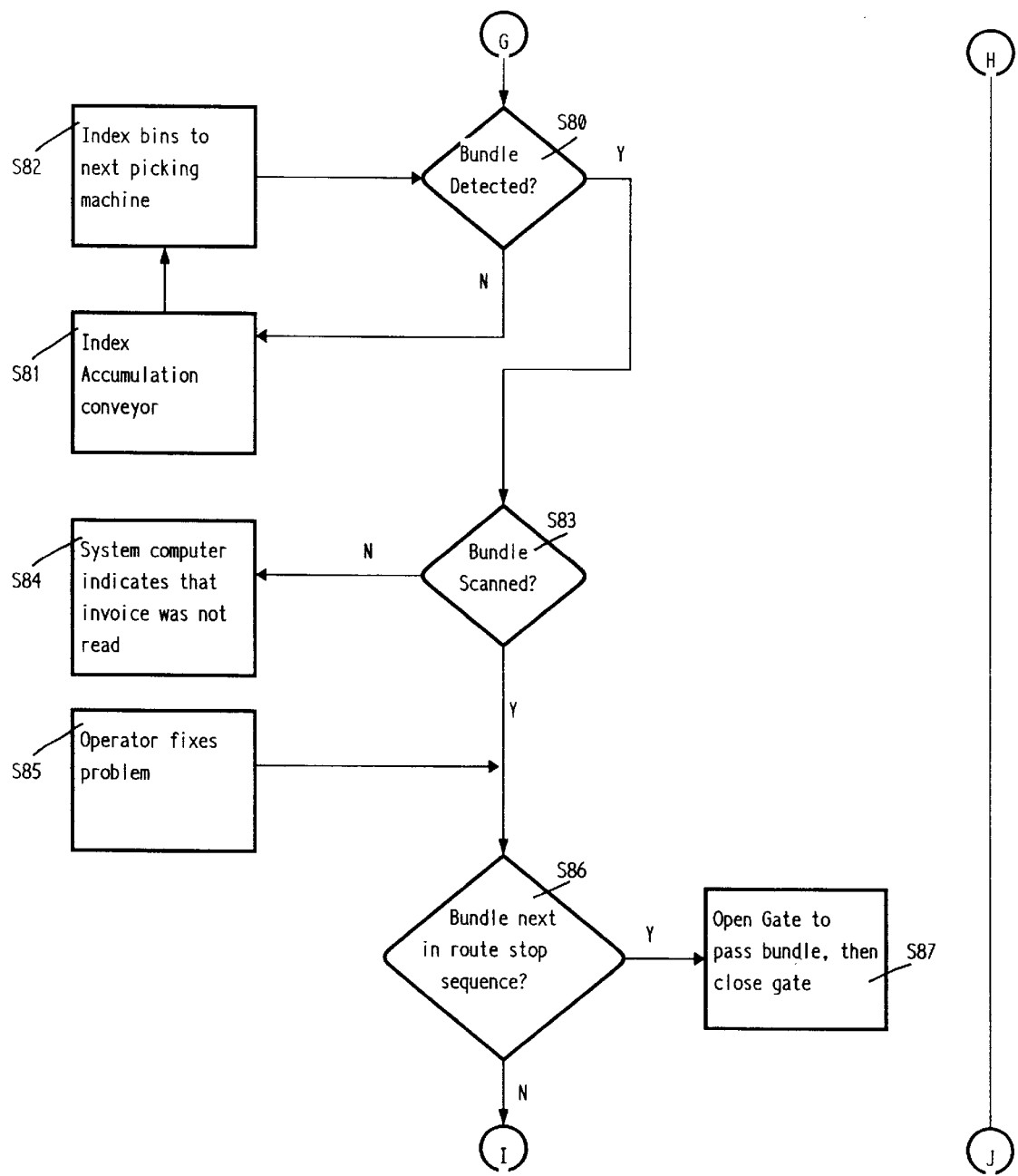
Figure 18F:
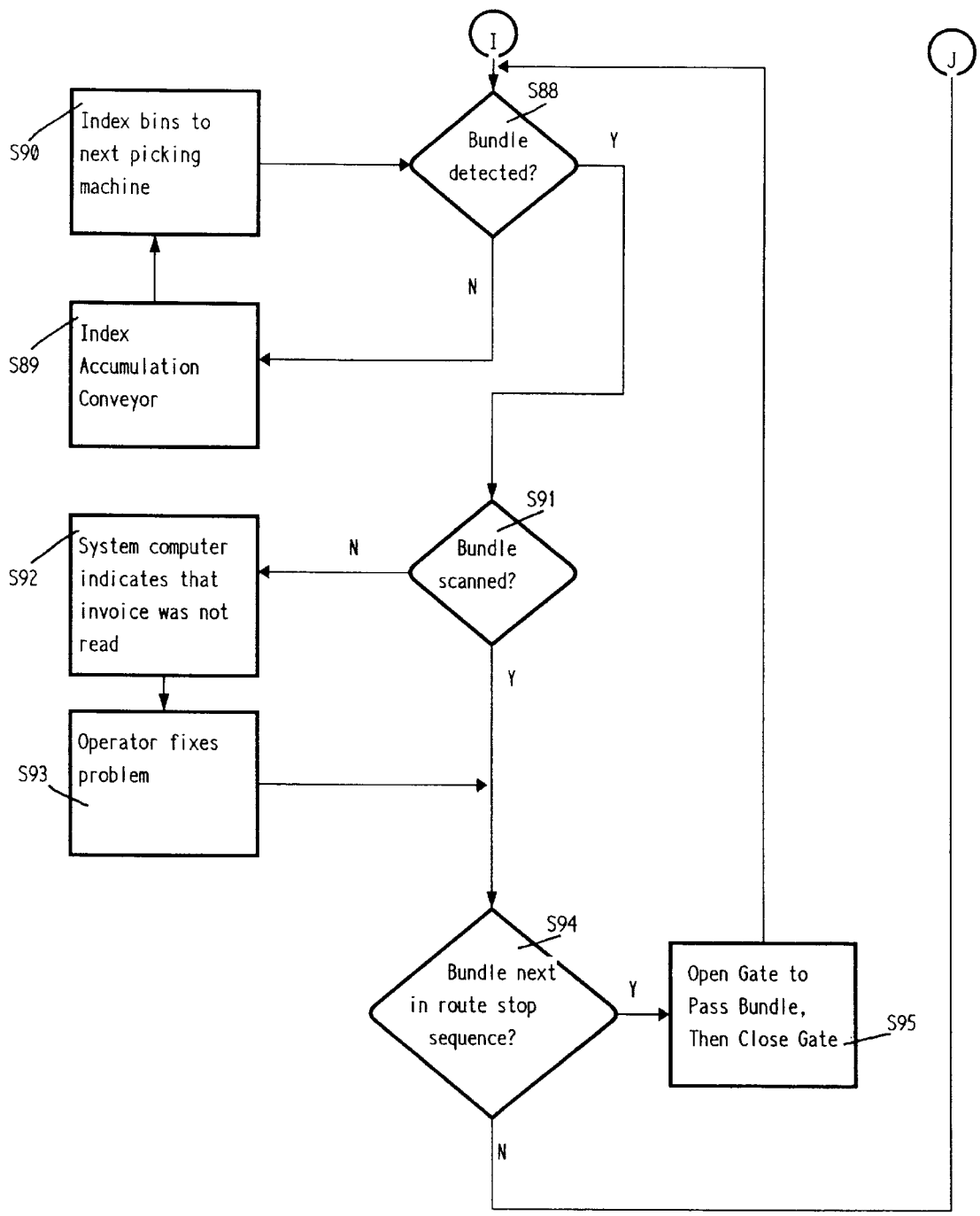

FIGS. 18A, 18B and 18C are a flow chart illustrating the logic operating the sequencing of the bundles and operation of the gates 260A–D and accumulation conveyors 310, 316, 322, 328 in the accumulation area 280. The circled A and circled B at the bottom of FIG. 18A match-up with the circled A and circled B at the top of FIG. 18B to form a part of a single flow chart. The circled C and circled D at the bottom of FIG. 18B match-up with the circled C and circled D at the top of FIG. 18C. the circled E and the circled F at the bottom of FIG. 18C match-up with the circled E and the circled F at the top of FIG. 18D. The circled G and circled H at the bottom of FIG. 18D match-up with the circled G and the circled H at the top of FIG. 18E. The circled I and circled J at the bottom of FIG. 18E match-up with the circled I and circled J at the top of FIG. 18F. Thus the combination of FIGS. 18A through 18F form a single flow chart. The circled As, Bs, Cs, Ds, Es, Fs, Gs, Hs, Js and Is do not designate a function. The system computer 270, in step S39, initializes certain parameters, one of which is step S1 of FIG. 14A, and also includes putting into operation the system and final conveyors 250, 252, 254, 256, 258, and closing the gates 260A–D.

When a bundle exits each assembly section of picking machines 230, 234, 238, 242 the bundle passes by the section output sensor and scanner 202, 203 of each section. Each of the bundles exiting each assembly section is either the entire or partial order of a single retailer. Each section output sensor and scanner 202, 203 sends a signal to the system computer 270. The section out put sensor 202 associated with assembly section 230 determines if a bundle passed by it in step S40. If a bundle did not pass by the section output sensor 202, then the system computer 270 indicates on its screen that there is a problem to the operator in step S41. The operator then fixes the problem in step S42. Then the system computer 270 checks to determine if the section output scanner 203 associated with assembly section 230 scanned the information off the invoice of the bundle and relayed that information to the system computer 270 in step S43. Alternatively, in step S40, if the bundle did pass by the section output sensor 202, then the system computer 270 checks to determine if the section output scanner 203 associated with assembly section 230 scanned the invoice of the bundle in step S43. If the invoice information was not scanned by section output scanner 203, then the system computer 270 indicates on its screen that there is a problem to the operator in step S44. The operator then fixes the problem in step S45. Then the system computer 270 checks to determine if a bundle passed by the section output sensor 202 associated with assembly section 234 in step S46. Alternatively, in step S43, if the invoice information was successfully scanned, then the system computer 270 checks to determine if a bundle passed by the section output sensor 202 associated with assembly section 234 in step S46.

Steps S46–S51 proceed similarly to steps S40–S45 described above, except that these steps concern assembly section 234. As discussed above, the section output sensor 202 associated with assembly section 234 determines if a bundle passed by it in step S46. If a bundle did not pass by the section output sensor 202, then the system computer 270 indicates on its screen that there is a problem to the operator in step S47. The operator then fixes the problem in step S48. Then the system computer 270 checks to determine if the section output scanner 203 associated with assembly section 234 scanned the information off the invoice of the bundle and relayed that information to the system computer 270 in step S49. Alternatively, in step S46, if the bundle did pass by the section output sensor 202, then the system computer 270 checks to determine if the section output scanner 203 associated with assembly section 234 scanned the invoice of the bundle in step S49. If the invoice information was not scanned by section output scanner 203, then the system computer 270 indicates on its screen that there is a problem to the operator in step S50. The operator then fixes the problem in step S51. Then the system computer 270 checks to determine if a bundle passed by the section output sensor 202 associated with assembly section 238 in step S52. Alternatively, in step S49, if the invoice information was successfully scanned, then the system computer 270 checks to determine if a bundle passed by the section output sensor 202 associated with assembly section 238 in step S52.

Steps S52–S57 proceed similarly to steps S46–S51 described above, except that these steps concern assembly section 238. As discussed above, the section output sensor 202 associated with assembly section 238 determines if a bundle passed by it in step S52. If a bundle did not pass by the section output sensor 202, then the system computer 270 indicates on its screen that there is a problem to the operator in step S53. The operator then fixes the problem in step S54. Then the system computer 270 checks to determine if the section output scanner 203 associated with assembly section 238 scanned the information off the invoice of the bundle and relayed that information to the system computer 270 in step S55. Alternatively, in step S52, if the bundle did pass by the section output sensor 202, then the system computer 270 checks to determine if the section output scanner 203 associated with assembly section 238 scanned the invoice of the bundle in step S55. If the invoice information was not scanned by section output scanner 203, then the system computer 270 indicates on its screen that there is a problem to the operator in step S56. The operator then fixes the problem in step S57. Then the system computer 270 checks to determine if a bundle passed by the section output sensor 202 associated with assembly section 242 in step S58. Alternatively, in step S55, if the invoice information was successfully scanned, then the system computer 270 checks to determine if a bundle passed by the section output sensor 202 associated with assembly section 242 in step S58.

Steps S58–S63 proceed similarly to steps S52–S57 described above, except that these steps concern assembly section 242. As discussed above, the section output sensor 202 associated with assembly section 242 determines if a bundle passed by it in step S58. If a bundle did not pass by the section output sensor 202, then the system computer 270 indicates on its screen that there is a problem to the operator in step S59. The operator then fixes the problem in step S60. Then the system computer 270 checks to determine if the section output scanner 203 associated with assembly section 242 scanned the information off the invoice of the bundle and relayed that information to the system computer 270 in step S61. Alternatively, in step S58, if the bundle did pass by the section output sensor 202, then the system computer 270 checks to determine if the section output scanner 203 associated with assembly section 242 scanned the invoice of the bundle in step S61. If the invoice information was not scanned by section output scanner 203, then the system computer 270 indicates on its screen that there is a problem to the operator in step S62. The operator then fixes the problem in step S63. Then the system computer 270 checks to determine if a bundle is at the gate 260A on accumulation conveyor 310 by the gate sensor 312 in step S64. Alternatively, in step S61, if the invoice information was successfully scanned, then the system computer 270 checks to determine if a bundle is at the gate 260A on accumulation conveyor 310 according to the gate sensor 312 in step S64.

As discussed above, the system computer 270 checks to determine if a bundle is at gate 260A on accumulation conveyor 310 according to the gate sensor 312 instep S64. If a bundle is not detected by the gate sensor 312, then the system computer 270 commands the accumulation conveyor 310 to index once, i.e. one bundle, in step S65. The system computer 270 then commands the assembly section 230 to index the bins 175 to the next picking machine in step S66. Then the system computer 270 checks to determine if a bundle is at gate 260A on accumulation conveyor 310 according to gate sensor 312 in step S64. Alternatively, in step S64, if the bundle is detected at gate 260A by the gate sensor 312, then the system computer 270 checks to determine if the gate scanner 314 scanned the invoice of the bundle in step S67. If the invoice information was not scanned by gate scanner 314, then the system computer 270 indicates on its screen that there is a problem to the operator in step S68. The operator then fixes the problem in step S69. Then the system computer 270 checks to determine if the bundle is the next bundle in the route stop sequence, by comparing the invoice data to the route stop sequence data in step S70. Alternatively, in step S67, if the invoice information was successfully scanned, then the system computer 270 checks to determine if the bundle is the next bundle in the route stop sequence in step S70. Then, if the bundle is the next bundle in the route stop sequence, then the gate 260A opens and the accumulation conveyor 310 is indexed so as to pass the bundle onto final conveyor 258 to be transported to the palletizing area 246. Then, the system computer 270 checks to determine if a bundle is detected by the gate sensor 312 as in step S64. Alternatively, in step S70, if the bundle is not the next bundle in the route stop sequence, then the system computer checks to determine if a bundle is at gate 260B on accumulation conveyor 316 according to gate sensor 318 in step S72.

Steps S72–S79 proceed similarly to steps S64–S71 described above, except that these steps concern the bundles coming off assembly section 234. As discussed above, the system computer 270 checks to determine if a bundle is at gate 260B on accumulation conveyor 316 according to the gate sensor 318 in step S72. If a bundle is not detected by the gate sensor 318, then the system computer 270 commands the accumulation conveyor 316 to index once, i.e. one bundle, in step S73. The system computer 270 then commands the assembly section 234 to index the bins 175 to the next picking machine in step S74. Then the system computer 270 checks to determine if a bundle is at gate 260B on accumulation conveyor 316 according to gate sensor 318 in step S72. Alternatively, in step S72, if the bundle is detected at gate 260B by the gate sensor 3 18, then the system computer 270 checks to determine if the gate scanner 320 scanned the invoice of the bundle in step S75. If the invoice information was not scanned by gate scanner 320, then the system computer 270 indicates on its screen that there is a problem to the operator in step S76. The operator then fixes the problem in step S77. Then the system computer 270 checks to determine if the bundle is the next bundle in the route stop sequence, by comparing the invoice data to the route stop sequence data in step S78. Alternatively, in step S75, if the invoice information was successfully scanned, then the system computer 270 checks to determine if the bundle is the next bundle in the route stop sequence in step S78. Then, if the bundle is the next bundle in the route stop sequence, then the gate 260B opens and the accumulation conveyor 316 is indexed so as to pass the bundle onto final conveyor 258 to be transported to the palletizing area 246. Then, the system computer 270 checks to determine if a bundle is detected by the gate sensor 318 as in step S72. Alternatively, in step S78, if the bundle is not the next bundle in the route stop sequence, then the system computer checks to determine if a bundle is at gate 260C on accumulation conveyor 322 according to gate sensor 324 in step S80.

Steps S80–S87 proceed similarly to steps S72–S79 described above, except that these steps concern the bundles coming off assembly section 238. As discussed above, the system computer 270 checks to determine if a bundle is a t gate 260C on accumulation conveyor 322 according to the gate sensor 324 in step S80. If a bundle is not detected by the gate sensor 324, then the system computer 270 commands the accumulation conveyor 322 to index once, i.e. one bundle, in step S81. The system computer 270 then commands the assembly section 238 to index the bins 175 to the next picking machine in step S82. Then the system computer 270 checks to determine if a bundle is at gate 260C on accumulation conveyor 322 according to gate sensor 324 in step S80. Alternatively, in step S80, if the bundle is detected at gate 260C by the gate sensor 324, then the system computer 270 checks to determine if the gate scanner 326 scanned the invoice of the bundle in step S83. If the invoice information was not scanned by gate scanner 326, then the system computer 270 indicates on its screen that there is a problem to the operator in step S84. The operator then fixes the problem in step S85. Then the system computer 270 checks to determine if the bundle is the next bundle in the route stop sequence, by comparing the invoice data to the route stop sequence data in step S86. Alternatively, in step S83, if the invoice information was successfully scanned, then the system computer 270 checks to determine if the bundle is the next bundle in the route stop sequence in step S86. Then, if the bundle is the next bundle in the route stop sequence, then the gate 260C opens and the accumulation conveyor 322 is indexed so as to pass the bundle onto final conveyor 258 to be transported to the palletizing area 246. Then, the system computer 270 checks to determine if a bundle is detected by the gate sensor 324 in step S80. Alternatively, in step S86, if the bundle is not the next bundle in the route stop sequence, then the system computer checks to determine if a bundle is at gate 260D on accumulation conveyor 328 according to gate sensor operation step S88.

Steps S88–S95 proceed similarly to steps S80–S87 described above, except that these steps concern the bundles coming off assembly section 242. As discussed above, the system computer 270 checks to determine if a bundle is at gate 260D on accumulation conveyor 328 according to the. gate sensor 330 in step S88. If a bundle is not detected by the gate sensor 330, then the system computer 270 commands the accumulation conveyor 328 to index once, i.e. one bundle, in step S89. The system computer 270 then commands the assembly section 242 to index the bins 175 to the next picking machine in step S90. Then the system computer 270 checks to determine if a bundle is at gate 260D on accumulation conveyor 328 according to gate sensor 330 in step S88. Alternatively, in step S88, if the bundle is detected at gate 260D by the gate sensor 330, then the system computer 270 checks to determine if the gate scanner 332 scanned the invoice of the bundle in step S91. If the invoice information was not scanned by gate scanner 332, then the system computer 270 indicates on its screen that there is a problem to the operator in step S92. The operator then fixes the problem in step S93. Then the system computer 270 checks to determine if the bundle is the next bundle in the route stop sequence, by comparing the invoice data to the route stop sequence data in step S94. Alternatively, in step S91, if the invoice information was successfully scanned, then the system computer 270 checks to determine if the bundle is the next bundle in the route stop sequence in step S94. Then, if the bundle is the next bundle in the route stop sequence, then the gate 260D opens and the accumulation conveyor 328 is indexed so as to pass the bundle onto final conveyor 258 to be transported to the palletizing area 246. Then, the system computer 270 checks to determine if a bundle is detected by the gate sensor 330 in step S88. Alternatively, in step S94, if the bundle is not the next bundle in the route stop sequence, then cycle of the system then starts all over again by having the system computer 270 index the bins 175 of each section of picking machines in step S39.

The flow chart in FIGS. 18A, 18B and 18C shows the decisions of each section output sensor 202, section output scanner 203, gate sensors 312, 318, 324, 330, and gate scanners 314, 320, 326, 332 occurring in a cascade structure, however, any appropriate arrangement is satisfactory.

Figure 19:
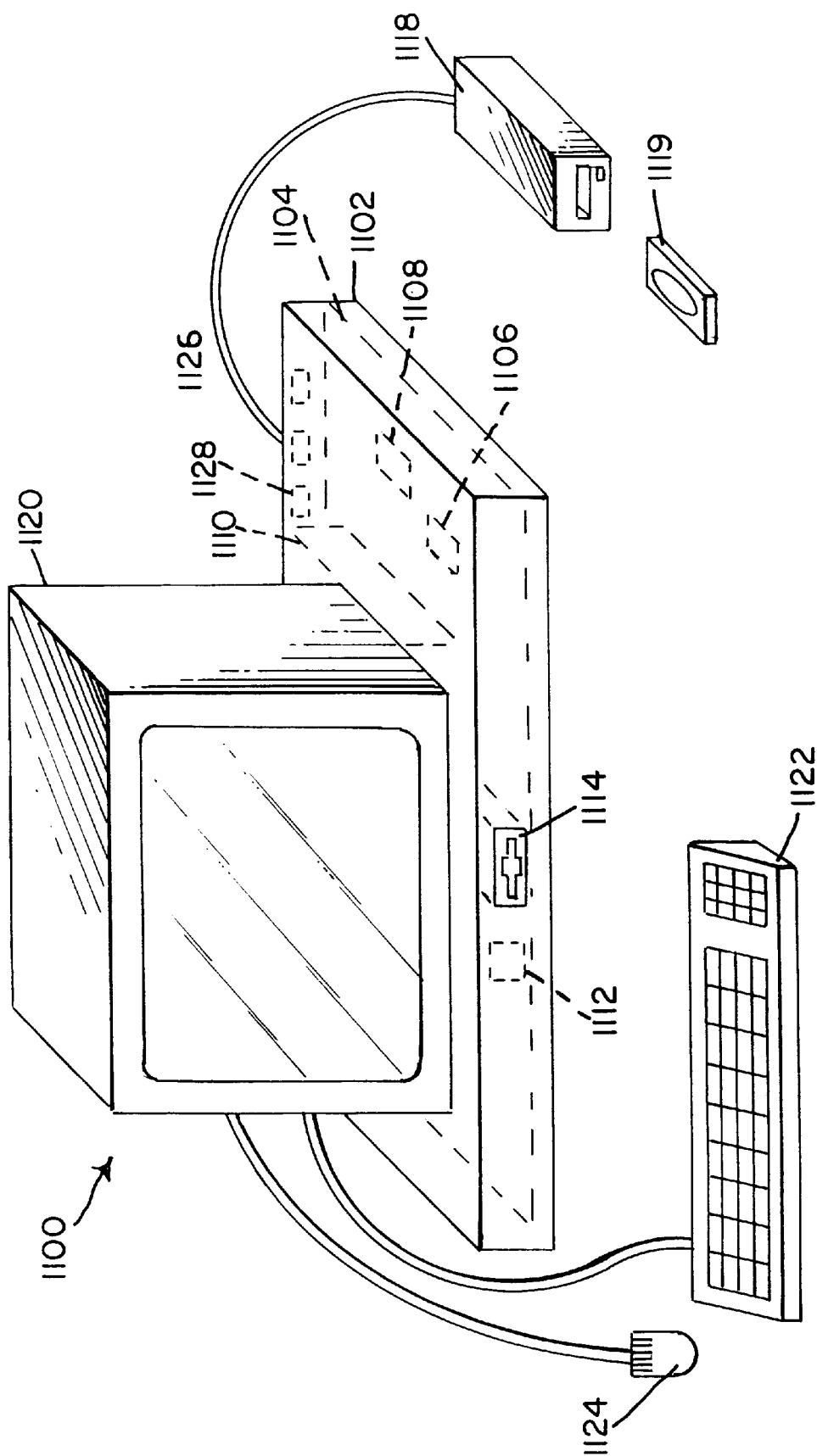
FIG. 19 schematically illustrates an example of a computer system for use in the system of the present invention.

The system computer 270 can be a computer system, illustrated schematically in FIG. 19. The computer system 1100 has a housing 1102 which houses a motherboard 1104 which contains a central processing unit (CPU) 1106 (e.g. Intel Pentium, Intel Pentium II, Dec Alpha, IBM/Motorola Power PC), memory 1108 (e.g., DRAM, ROM, EPROM, EEPROM, SRAM and Flash RAM), and other optional special purpose logic devices (e.g., ASICs) or configurable logic devices (e.g., GAL and reprogrammable FPGA such as a PLC(programmable logic controller)). The computer also contains a communication port 1128 for communicating with the group section computers 220. The computer 1100 further includes plural input devices, (e.g., a keyboard 1122 and mouse 1124), and a display card 1110 for controlling monitor 1120. In addition, the computer system 1100 includes a floppy disk drive 1114; other removable media devices (e.g., compact disc 1119, tape, and removable magneto-optical media (not shown)); and a hard disk 1112, or other fixed, high density media drives, connected using an appropriate device bus (e.g., a SCSI bus or an Enhanced IDE bus). Although compact disc 1119 is shown in a CD caddy, the compact disc 1119 can be inserted directly into CD-ROM drives which do not require caddies. Also connected to the same device bus or another device bus as the high density media drives, the computer 1100 may additionally include a compact disc reader 1118, a compact disc reader/writer unit (not shown) or a compact disc jukebox (not shown). In addition, a printer (not shown) can provide printed copies of important information related to the operation of the article picking system.

The computer system further includes at least one computer readable medium. Examples of such computer readable media are compact discs 1119, hard disks 1112, floppy disks, tape, magneto-optical disks, PROMs (EPROM, EEPROM, Flash EPROM), DRAM, SRAM, etc.

Stored on any one or on a combination of the computer readable media, the present invention includes software for controlling both the hardware of the computer 1100 and for enabling the computer 1100 to interact with a human user and the controlled system. Such software may include, but is not limited to, device drivers, operating systems and user applications, such as development tools and (graphical) system monitors. Such computer readable media further includes a computer program, according to the present invention, for operating the article picking system.

The group section computers 220 are configured similarly as is the computer system 1100 as described above.

The picking machine computers 185 are programable logic controllers (PLC) as described above.

As should be apparent to those skilled in the art, the invention can be conveniently implemented using a conventional general purpose digital computer or microprocessor programmed according to the teachings of the present specification. Appropriate software coding can be prepared based on the teachings of the present disclosure, as will be apparent to those skilled in the software art. The invention can also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters: Patent of the United States is:

1. A system for organizing a plurality of articles, comprising:
   (a) a system computer;
   (b) a plurality of section computers each connected to said system computer;
   (c) a plurality of section conveyer assemblies, one of said plurality of section conveyor assemblies operably connected to one of said plurality of section computers, respectively; and
   (d) a plurality of picking machines operably connected with each of said plurality of section computers and said respective section conveyor assembly, each of said plurality of picking machines comprising:
   (1) a picking machine frame;
   (2) a picking machine computer mounted on said picking machine frame and connected to said section computer for enabling a selected number of articles to be removed from said picking machine;
   (3) a suction mechanism movably mounted on said picking machine frame and connected to said picking machine computer;
   (4) stack conveying means on said picking machine frame for delivering a stack of articles to a first position; and
   (5) means for moving said suction mechanism to pick up an uppermost articles from said stack of articles at said first position and moving said uppermost article to a bin, wherein said bin rests atop said respective section conveyor assembly.

2. A system for organizing a plurality of articles according to claim 1, further comprising a plurality of section output sensors and scanners connected to said system computer, one of said plurality of section output sensors and scanners located at an output of said plurality of section conveyor assemblies, respectively.

3. A system for organizing a plurality of articles according to claim 2, further comprising a plurality of system conveyor assemblies, one of said plurality of system conveyor assemblies being operably connected to one of said plurality of section conveyor assemblies, respectively, and connected to said system computer.

4. A system for organizing a plurality of articles according to claim 3, further comprising a final conveyor assembly operably connected to an output end of said plurality of system conveyor assemblies and connected to said system computer.

5. A system for organizing a plurality of articles according to claim 4, further comprising an accumulation area having accumulation conveyor assemblies associated with each of said system conveyor assemblies, respectfully, each of said accumulation conveyor assemblies having an input end located adjacent to the output end of said system conveyor assembly, and each of said accumulation conveyor assemblies having an output end adjacent to the input end of said final conveyor assembly.

6. A system for organizing a plurality of articles according to claim 5, further comprising gates, one of said gates connected to said output end of each of said accumulation conveyor assemblies, respectfully, and connected to said system computer, and each gate having a gate sensor and a gate scanner mounted adjacent to said gate, each of said gate sensors and gate scanners connected to said system computer.

7. A system for organizing a plurality of articles according to claim 6, further comprising a palletizing area located adjacent to an output of said final conveyor.

8. A system for organizing a plurality of articles according to claim 1, wherein said stack conveying means comprises a plurality of a vertically moving shelves which each carry a stack of articles.

9. A system for organizing a plurality of articles according to claim 8, wherein each of said shelves is pivotable at said first position from a horizontal position to a vertical position when depleted of stacked articles.

10. A system for organizing a plurality of articles according to claim 1, wherein said suction mechanism is slidably mounted on rods, said moving means sliding said suction mechanism between said first and second positions along said rods.

11. A system for organizing a plurality of articles according to claim 1, wherein said bin rests on said section conveyor assembly.

12. A system for organizing a plurality of articles according to claim 1, wherein said moving means for moving said suction mechanism comprises first means for moving said suction mechanism in a downward direction toward the uppermost article and in an upward direction to lift up the uppermost article.

13. A system for organizing a plurality of articles according to claim 1, further comprising detecting means connected to said picking machine computer for detecting the articles on said shelves at said first position.

14. A system for organizing a plurality of articles according to claim 1, further comprising an article sensor mounted on said picking machine frame and connected to said picking machine computer for detecting delivery of said article to said bin by said suction mechanism.

15. A system for organizing a plurality of articles according to claim 1, wherein said suction mechanism includes a cylinder device for actuating said suction mechanism in a vertical direction.

16. A system for organizing a plurality of articles according to claim 15, wherein said suction mechanism includes a guide bar mechanism for actuating said suction mechanism in a horizontal direction.

17. A system for organizing a plurality of articles, comprising:

(a) a system computer;

(b) a plurality of section computers each connected to said system computer;

(c) a plurality of section conveyor assemblies, one of said plurality of section conveyor assemblies operably connected to one of said plurality of section computers, respectively;

(d) a plurality of picking machines operably connected with each of said plurality of section computers and said respective section conveyor assembly;

(e) a plurality of section output sensors and scanners connected to said system computer, one of said plurality of section output sensors and scanners located at an output of said plurality of section conveyor assemblies, respectively;

(f) a plurality of system conveyor assemblies, one of said plurality of system conveyor assemblies being operably connected to one of said plurality of section conveyor assemblies, respectively, and connected to said system computer;

(g) a final conveyor assembly operably connected to an output end of said plurality of system conveyor assemblies and connected to said system computer;

(h) an accumulation area having accumulation conveyor assemblies associated with each of said system conveyor assemblies, respectively, each of said accumulation conveyor assemblies having an input end located adjacent to the output end of said system conveyor assembly, and each of said accumulation conveyor assemblies having an output end adjacent to the input end of said final conveyor assembly, said accumulation area having a length of thirty feet.

18. A system for organizing a plurality of articles, comprising:

(a) a system computer;

(b) a plurality of section computers each connected to said system computer;

(c) a plurality of section conveyor assemblies, one of said plurality of section conveyor assemblies operably connected to one of said plurality of section computers, respectively; and (d) a plurality of picking machines operably connected with each of said plurality of section computers and said respective section conveyor assembly, each of said plurality of picking machines comprising:

(1) a picking machine frame;

(2) a picking machine computer mounted on said picking machine frame and connected to said section computer;

(3) a suction mechanism movably mounted on said picking machine frame and connected to said picking machine computer;

(4) stack conveying means on said picking machine frame for delivering a stack of articles to a first position;

(5) means for moving said suction mechanism to pick up an uppermost article from said stack of articles at said first position and moving said uppermost article to a bin, wherein said bin rests atop said respective section conveyor assembly; and (6) a bin sensor mounted on said picking machine frame and connected to said picking machine computer for detecting a location of said bin.

19. A system for organizing a plurality of articles, comprising:

(a) a system computer;

(b) a plurality of section computers each connected to said system computer;

(c) a plurality of section conveyor assemblies, one of said plurality of section conveyor assemblies operably connected to one of said plurality of section computers, respectively;

(d) a plurality of picking machines operably connected with each of said plurality of section computers and said respective section conveyor assembly; each of said plurality of picking machines comprising:

(1) a picking machine frame;

(2) a picking machine computer mounted on said picking machine frame and connected to said section computer;

(3) a suction mechanism movably mounted on said picking frame and connected to said picking machine computer;

(4) stack conveying means on said picking machine frame for delivering a stack of articles to a first position;

(5) means for moving said suction mechanism to pick up an uppermost articles from said stack of articles at said first position and moving said uppermost article to a bin, wherein said bin rests atop said respective section conveyor assembly; and (6) a pneumatic cylinder mounted on said picking machine frame and connected to said picking machine computer for engaging said bin.

* * * * *